US011970367B2

(12) United States Patent
García Canales et al.

(10) Patent No.: US 11,970,367 B2
(45) Date of Patent: Apr. 30, 2024

(54) SAFETY BRAKE ACTUATOR

(71) Applicant: Otis Elevator Company, Farmington, CT (US)

(72) Inventors: Manuel García Canales, Madrid (ES); Jesus Santiago Cañizares, Madrid (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/987,542

(22) Filed: Nov. 15, 2022

(65) Prior Publication Data

US 2024/0067500 A1 Feb. 29, 2024

(30) Foreign Application Priority Data

Aug. 31, 2022 (EP) .................................... 22382813

(51) Int. Cl.
*B66B 5/18* (2006.01)
*H01F 7/02* (2006.01)

(52) U.S. Cl.
CPC ................. *B66B 5/18* (2013.01); *H01F 7/02* (2013.01)

(58) Field of Classification Search
CPC .... B66B 5/14; B66B 5/16; B66B 5/04; B66B 5/18
See application file for complete search history.

(56) References Cited

U.S. PATENT DOCUMENTS

| | | | | |
|---|---|---|---|---|
| 8,657,076 B2 * | 2/2014 | Beaudry | B66B 7/048 187/409 |
| 8,955,649 B2 * | 2/2015 | Yokobayashi | B66B 7/1292 15/88.1 |
| 10,246,295 B2 * | 4/2019 | Hu | B66B 5/0031 |

FOREIGN PATENT DOCUMENTS

| | | | |
|---|---|---|---|
| DE | 3715098 A1 | 11/1987 | |
| EP | 2666743 A1 | 11/2013 | |
| EP | 3225579 A1 | 10/2017 | |
| JP | 2004250127 A * | 9/2004 | B66B 7/047 |
| JP | 2008254837 A * | 10/2008 | |

OTHER PUBLICATIONS

Machine Translation of EP 2666743.*
European Search Report for Application No. 22382813.8; dated Feb. 6, 2023; 7 Pages.

* cited by examiner

*Primary Examiner* — Diem M Tran
(74) *Attorney, Agent, or Firm* — CANTOR COLBURN LLP

(57) ABSTRACT

An elevator system includes a guide rail, an elevator car, a safety brake actuator and a safety brake. The safety brake actuator and the safety brake are mounted to the elevator car to move along the guide rail with the elevator car in use. The safety brake actuator includes an actuation mechanism configured in use to actuate the engagement of the safety brake against the guide rail. The safety brake actuator also includes a proximal surface, the safety brake actuator is mounted adjacent to the guide rail with the proximal surface facing the guide rail and spaced from the guide rail to define a clearance gap between the guide rail and the proximal surface of the safety brake actuator.

15 Claims, 21 Drawing Sheets

SAFETY BRAKE ACTUATOR

FOREIGN PRIORITY

This application claims priority to European Patent Application No. 22382813.8, filed Aug. 31, 2022, and all the benefits accruing therefrom under 35 U.S.C. § 119, the contents of which in its entirety are herein incorporated by reference.

TECHNICAL FIELD

The present disclosure relates to safety brake actuators for actuating a safety brake in an elevator system, and to elevator systems comprising such safety brake actuators.

BACKGROUND

It is known in the art to mount safety brakes onto elevator components moving along guide rails, to bring the elevator component quickly and safely to a stop, especially in an emergency. In many elevator systems the elevator car is hoisted by a tension member with its movement being guided by a pair of guide rails. Typically, a governor is used to monitor the speed of the elevator car. According to standard safety regulations, such elevator systems must include an emergency braking device (known as a safety brake, "safety gear" or "safety") which is capable of stopping the elevator car from moving downwards, even if the tension member breaks, by gripping a guide rail. Safety brakes may also be installed on the counterweight or other components moving along guide rails.

Electronic Safety Actuators (ESA's) are now commonly used instead of using mechanical governors to trigger a safety brake, e.g. using electronic or electrical control. Some ESA's activate a safety brake by controlled release of a magnet (either a permanent magnet or an electromagnet) to drag against the guide rail, and using the friction resultant therefrom to pull up on a linkage attached to the safety brake. Some other ESA's use a different mechanism other than a friction interaction between a magnet and the guide rail to actuate the safety brake. For example, in some frictionless electronic safety actuators, a spring force is controlled to pull on a linkage that engages a safety brake.

It is important that safety brake actuators operate reliably to engage the safety brake when required, especially in emergency situations. There is a need to improve the reliability of safety brake actuators.

SUMMARY

According to a first aspect of this disclosure, there is provided an elevator system comprising a guide rail, an elevator car, a safety brake actuator and a safety brake, wherein the safety brake actuator and the safety brake are mounted to the elevator car to move along the guide rail with the elevator car in use; wherein the safety brake actuator comprises: an actuation mechanism configured in use to actuate the engagement of the safety brake against the guide rail; a proximal surface, wherein the safety brake actuator is mounted adjacent to the guide rail with the proximal surface facing the guide rail and spaced from the guide rail to define a clearance gap between the guide rail and the proximal surface of the safety brake actuator; and an object-diverting arrangement positioned relative to the clearance gap to prevent or impede the entry of foreign objects into the clearance gap.

This aspect of the disclosure extends to a safety brake actuator for use in an elevator system comprising a guide rail, an elevator car, and a safety brake, wherein the safety brake is mounted to the elevator car and the safety brake actuator is configured to be mounted to the elevator car to move along the guide rail with the elevator car in use; wherein the safety brake actuator comprises: an actuation mechanism configured in use to actuate the engagement of the safety brake against the guide rail; a proximal surface which, when the safety brake actuator is mounted adjacent to the guide rail with the proximal facing the guide rail and spaced from the guide rail in use, defines a clearance gap between the guide rail and the proximal surface of the safety brake actuator; and an object-diverting arrangement positioned relative to the clearance gap to prevent or impede the entry of foreign objects into the clearance gap.

The safety brake actuator may comprise a slot for accommodating the guide rail, wherein the guide rail is disposed in the slot in use to define the clearance gap between the guide rail and the proximal surface of the safety brake actuator. It is to be appreciated that in examples where in the safety brake actuator comprises a slot for accommodating the guide rail, the proximal surface of the safety brake actuator may be a surface of the slot which faces the guide rail in use.

It will be understood from the present disclosure that the term "proximal" refers to the position of the proximal surface when the safety brake actuator is mounted adjacent to the guide rail in use, i.e. it is a surface of the safety brake actuator that faces the guide rail in use. Proximal may also be expressed as "situated close to", e.g. the proximal surface may be a surface of the safety brake actuator that is closest to the guide rail in use. The safety brake actuator may comprise a housing. The housing may comprise the proximal surface. The proximal surface may be or comprise an uppermost surface of the safety brake actuator which faces the guide rail in use. In this context, "uppermost" refers to the highest point with respect to gravity when the safety brake actuator is mounted adjacent to the guide rail in use.

The safety brake actuator may be capable of being configured to be electronically or electrically actuated, e.g. by a controller providing an actuation signal to the actuation mechanism and/or interrupting an electrical power supply to the actuation mechanism. Such safety brake actuators may be referred to as "electronic safety actuators". In some examples, the safety brake actuator is configured to be electronically actuated, e.g. the actuation mechanism is configured in use to actuate the engagement of the safety brake against the guide rail in response to an electronic or electrical signal. In some examples, the safety brake actuator may be connected to or comprise an electronic controller, but this is not essential. The safety brake actuator may be configured or configurable to be actuated mechanically.

In some examples, the actuation mechanism may be configured in use to actuate the engagement of the safety brake against the guide rail i) in response to an actuation signal (e.g. an electronic or electrical actuation signal) and/or ii) in the event that electrical power to the safety brake actuator is interrupted (e.g. in response to a controller interrupting the electrical power or in the event of the electrical power being interrupted by a power failure). In other examples, the actuation mechanism may be configured in use to actuate the engagement of the safety brake against the guide rail in response to a mechanical actuation, e.g. by a mechanical governor operating the actuation mechanism.

The provision of an object-diverting arrangement may reduce or avoid instances of foreign objects (e.g. small component parts, debris) falling into the clearance gap between the safety brake actuator and the guide rail. Foreign objects falling into the clearance may impede the reliable operation of the safety brake actuator. It will be understood in the context of the present disclosure that the term "foreign object" may refer to any object that does not form part of the safety brake actuator, e.g. any object that is not intended to be inside the safety brake actuator in use and/or which may impede the proper and reliable functioning thereof. For example, a foreign object may become lodged in a portion of the safety brake actuator that prevents a component operating correctly, e.g. moving into or out of a position. Foreign objects made of ferromagnetic material may be particularly problematic because, as noted above, safety brake actuators typically use magnets (electromagnets and/or permanent magnets) in their actuation mechanism. Ferromagnetic foreign objects may be attracted by a magnet and become stuck to the magnet. The foreign object stuck to the magnet may prevent correct operation of the safety brake actuator, e.g. by reducing friction between a magnetic brake pad and the guide rail or otherwise impairing an actuation mechanism that uses a magnet. The provision of an object-diverting arrangement in accordance with the present disclosure may improve reliability of the safety brake actuator.

As noted above, the object-diverting arrangement is positioned relative to the clearance gap to prevent or impede the entry of foreign objects into the clearance gap. For example, the object-diverting arrangement may be positioned in, over, or adjacent to the clearance gap.

The object-diverting arrangement may be configured to capture or deflect foreign objects, e.g. before they can enter the clearance gap.

In a set of examples, the object-diverting arrangement comprises a magnet. The magnet may be disposed to attract and capture magnetic foreign objects entering the clearance gap, i.e. the magnet may divert the foreign objects away from the clearance gap by capturing them.

The magnet may comprise a permanent magnet. A permanent magnet may provide a convenient object-diverting arrangement (e.g. cost-effective, easily manufactured) that provides an uninterrupted magnetic field to capture foreign objects at any time. However, it is not essential for the magnet to be a permanent magnet. For example, the magnet may comprise an electromagnet, e.g. powered by a direct current.

The magnet may be disposed on the safety brake actuator such that in use the magnet is adjacent an uppermost entry point of the clearance gap. As used herein, "uppermost" refers to the highest point with respect to gravity.

The magnet may be disposed on the safety brake actuator such that in use the magnet is higher than any permanent magnet(s) and electromagnet(s) that form part of the actuation mechanism.

The magnet may be mounted on an exterior of the safety brake actuator, e.g. on the proximal surface or embedded in the proximal surface. The magnet may be mounted on or in a housing provided on the safety brake actuator, e.g. on an exterior of the housing.

In some examples, the magnet may be oriented to direct a strongest part of a magnetic field of the magnet into the clearance gap. For example, one of the poles of the magnet may face the guide rail. In some other examples, the magnet may be oriented differently from this, e.g. oriented parallel to the guide rail.

In some examples, the magnet may have a magnetic field that is weaker than a magnetic field of a permanent magnet or electromagnet that forms part of the actuation mechanism. This may avoid the generation of strong attractive forces between the magnet and the guide rail that may impede the proper operation of the elevator or the safety brake actuator. In some other examples the magnet may have a magnetic field that is stronger than a magnetic field of a permanent magnet or electromagnet that forms part of the actuation mechanism. This stronger magnetic field may ensure that foreign objects are duly captured or diverted.

In a set of examples, the object-diverting arrangement comprises a structural barrier.

The object-diverting arrangement may be configured to provide a reduced width for the clearance gap. Providing a reduced width for the clearance gap means that foreign objects that might otherwise fit into the clearance gap are too big to enter the clearance gap and instead are deflected away from the clearance gap by the object-diverting arrangement.

In a set of examples, the object-diverting arrangement comprises a structural barrier extending partially or completely across the clearance gap. The structural barrier may extend across at least 50% of the clearance gap, e.g. at least 75% of the clearance gap, at least 90% of the clearance gap, e.g. 100% of the clearance gap.

As the elevator car moves up and down the guide rail in use, the safety brake actuator may undergo some lateral movement with respect to the guide rail, e.g. due to vibrations of the elevator car. As used herein, "lateral movement" refers to any movement perpendicular to an elongate axis of the guide rail.

The structural barrier may be configured or mounted so that a physical position of the structural barrier automatically adapts to variations in the size of the clearance gap in response to any lateral movements of the safety brake actuator relative to the guide rail during operation of the elevator system. For example, the structural barrier may adapt to maintain the reduced width at zero (i.e. so that the structural barrier stays in contact with the guide rail). The reduced width of the clearance gap may vary if there is any lateral movement of the safety brake actuator during operation of the elevator system. The structural barrier may adapt to maintain the reduced width below a maximum width or to accommodate relative movement of the safety brake actuator and the guide rail that is larger than the maximum width. In some non-limiting examples, the maximum width may be 1 mm, 0.5 mm, 0.2 mm, or 0 mm.

In a set of examples, the structural barrier comprises a cover moveably mounted or configured to be moveably mounted with respect to the safety brake actuator, e.g. so that it is not fixedly mounted to the safety brake actuator. For example, when the cover is moveably mounted, the safety brake actuator may be able to move laterally with respect to the cover.

The cover may at least partially cover the clearance gap, i.e. such that a portion of the cover extends partially or fully across the clearance gap. This may provide a reduced width for the clearance gap. The cover may thereby deflect foreign objects that would otherwise fall into the clearance gap.

In some examples, the cover comprises a slot for accommodating the guide rail. In examples in which the safety brake actuator comprises a slot for accommodating the guide rail, a width of the slot in the cover may be smaller than a width of the slot in the safety brake actuator. In such examples, in use, the cover may be mounted with the guide rail disposed in the cover's slot, e.g. the cover may be mounted so that the cover's slot is nested in the safety brake actuator's slot, with the guide rail in the cover's slot. The smaller width of the slot may provide a reduced width for the clearance gap. In some examples, the cover may comprise a slot while the safety brake actuator does not comprise a slot, e.g. the safety brake actuator may be positioned adjacent to the guide rail and the cover may be positioned with its slot adjacent to the proximal surface of the safety brake actuator and with the guide rail disposed in the slot.

As mentioned above, the safety brake actuator may undergo some lateral movement with respect to the guide rail as the elevator car moves up and down the guide rail in use. This lateral movement of the safety brake actuator relative to the guide rail causes the clearance gap to vary. The clearance gap is large enough to allow for this lateral movement, but the lateral movement may be greater than the reduced width of the clearance gap. The reduced width of the clearance gap may therefore not permit sufficient movement of the cover to accommodate the lateral movement of the safety brake actuator. Instead, the lateral movement may be accommodated by the moveable mounting of the cover, i.e. such that when the safety brake actuator moves laterally with respect to the guide rail, it also moves relative to the cover. The cover may undergo little or no lateral movement, so it maintains a reduced width for the clearance gap. It will be appreciated from the above disclosure that the moveable mounting of the cover with respect to the safety brake actuator may allow the provision of a reduced width for the clearance gap while still accommodating the lateral movement of the safety brake actuator that occurs during operation of the elevator system.

It will be appreciated from the present disclosure that, depending on the reduced width of the clearance gap, it may be possible for the cover to move with respect to the guide rail (e.g. by a small distance that is less than the clearance gap). The reduced width of the clearance gap may therefore vary when the cover moves. However, owing to restriction of the movement of the cover, e.g. by the width of the slot, the cover may maintain the reduced width of the clearance gap below a maximum width. In some non-limiting examples, the maximum width may be 1 mm, 0.5 mm, or 0.2 mm.

The cover may be shaped to substantially enclose the safety brake actuator, or to substantially enclose the safety brake actuator on at least 2, at least 3, at least 4 or at least 5 sides thereof, e.g. such that the cover has no gaps larger than the reduced width of the clearance gap.

The safety brake actuator may be mounted, e.g. fixedly mounted, to the elevator car in use such that the cover is moveable with respect to the safety brake actuator. The cover may be moveably (e.g. flexibly) mounted to the safety brake actuator, e.g. by means of a flexible mounting. The cover may be moveably mounted with respect to the safety brake actuator without being fixedly mounted to any other component.

For example, the safety brake actuator may be mounted or configured to be mounted to the elevator car with mounting elements (e.g. pins, screws) with the cover mounted via holes or slots around the mounting elements, wherein the holes or slots have at least one dimension larger than a dimension of the mounting elements to allow relative movement of the cover and the safety brake actuator.

In a set of examples, the structural barrier comprises a resiliently biased barrier. The resiliently biased barrier may be biased to extend across the clearance gap.

The resiliently biased barrier may protrude a distance into the clearance gap, i.e. so that it extends partially or fully across the clearance gap. The resiliently biased barrier may be biased towards a maximum protrusion distance. The safety brake actuator may comprise a biasing arrangement (e.g. a spring, a magnetic biasing arrangement, a hydraulic biasing arrangement, a pneumatic spring, a rubber spring, a coil spring, a bent piece of metal, etc.) to provide a biasing force to bias the barrier towards the maximum protrusion distance. It will be understood from the present disclosure that the distance that the resiliently biased barrier protrudes into the gap may vary, e.g. as the barrier moves against or in response to the biasing force, such that the resiliently biased barrier automatically adapts to variations in the size of the clearance gap in response to any lateral movements of the safety brake actuator relative to the guide rail during operation of the elevator system.

As noted above, the safety brake actuator may undergo some lateral movement as the elevator car moves up and down the guide rail in use, causing the clearance gap to vary. The clearance gap is large enough to accommodate this lateral movement. The resiliently biased barrier may provide a reduced width for the clearance gap, which may be smaller than a typical range of lateral movement of safety brake actuator. However, the resiliently biased barrier may nevertheless accommodate the lateral movement of the safety brake actuator. If the safety brake actuator moves towards guide rail by an amount larger than the reduced width of the clearance gap, the guide rail may contact the resiliently biased barrier, and the resilient biased barrier may move against the biasing force to accommodate this movement. If the safety brake actuator moves back away from the guide rail, the biasing force may restore the position of the resiliently biased barrier to maintain the reduced clearance gap below a maximum value. It will be appreciated from the above disclosure that the resiliently biased barrier may allow the clearance gap to be reduced to deflect foreign objects from the clearance gap, while still accommodating any lateral movement of the safety brake actuator that occurs during operation of the elevator system.

The resiliently biased barrier may be configured to move angularly, e.g. it may comprise a hinged barrier. The resiliently biased barrier may be formed from a separate piece mounted on portion of the safety brake actuator, e.g. wherein a spring or resilient hinge provides the biasing force. The resiliently biased barrier may be integrally formed with a portion of the safety brake actuator, e.g. integrally formed with a housing or lid of the safety brake actuator from a resilient material.

The resiliently biased barrier may be configured to move linearly, such that it can undergo translational movement towards and away from the guide rail. For example, the resiliently biased barrier may be a sliding barrier. A resilient element (e.g. a spring, a magnetic biasing arrangement, a hydraulic biasing arrangement, a pneumatic spring, a rubber spring, a coil spring, a bent piece of metal, etc.) may provide a biasing force to bias the barrier towards the guide rail in use.

The safety brake actuator may comprise an electromagnet and/or a permanent magnet as part of the actuation mechanism. In various examples, the safety brake actuator may be of a type wherein the actuation mechanism comprises a brake pad that is brought into frictional engagement with the guide rail (e.g. wherein the brake pad comprises a magnet and is released or actuated by an electromagnet). For example, the brake pad may be brought into engagement with the guide rail in response to an actuation signal causing a frictional force to be exerted on the brake pad by the guide rail. The frictional force may be transmitted to a linkage that pushes or pulls the safety brake into engagement with the guide rail. In such examples, the object-diverting arrangement can impede or prevent foreign objects from entering the clearance gap which may otherwise interfere with the brake pad coming into frictional engagement with the guide rail and hence interfere with proper operation of the safety brake actuator to activate the safety brake.

DRAWING DESCRIPTION

Certain preferred examples of this disclosure will now be described, by way of example only, with reference to the accompanying drawings, in which.

DETAILED DESCRIPTION

Figure 1:
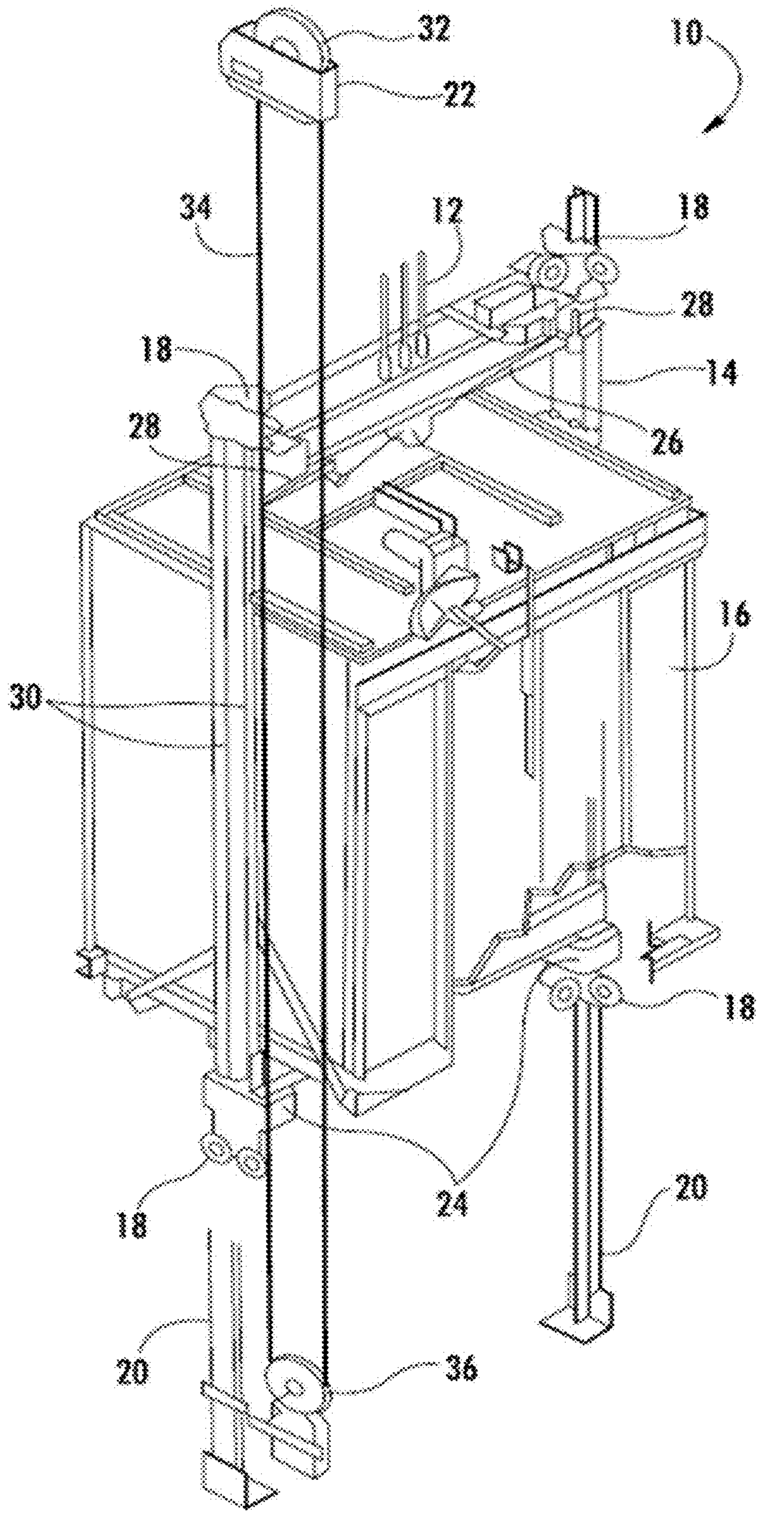
FIG. 1 shows an example of an elevator system employing a mechanical governor.

FIG. 1 shows an elevator system, generally indicated at 10. The elevator system 10 includes cables or belts 12, a car frame 14, an elevator car 16, roller guides 18, guide rails 20, a governor 22, and a pair of safety brakes 24 mounted on the elevator car 16. The governor 22 is mechanically coupled to actuate the safety brakes 24 by linkages 26, levers 28, and lift rods 30. The governor 22 includes a governor sheave 32, rope loop 34, and a tensioning sheave 36. The cables 12 are connected to the car frame 14 and a counterweight (not shown) inside a hoistway. The elevator car 16, which is attached to the car frame 14, moves up and down the hoistway by a force transmitted through the cables or belts 12 to the car frame 14 by an elevator drive (not shown) commonly located in a machine room at the top of the hoistway. The roller guides 18 are attached to the car frame 14 to guide the elevator car 16 up and down the hoistway along the guide rails 20. The governor sheave 32 is mounted at an upper end of the hoistway. The rope loop 34 is wrapped partially around the governor sheave 32 and partially around the tensioning sheave 36 (located in this example at a bottom end of the hoistway). The rope loop 34 is also connected to the elevator car 16 at the lever 28, ensuring that the angular velocity of the governor sheave 32 is directly related to the speed of the elevator car 16.

In the elevator system 10 shown in FIG. 1, the governor 22, a machine brake (not shown) located in the machine room, and the safety brakes 24 act to stop the elevator car 16 if it exceeds a set speed as it travels inside the hoistway. If the elevator car 16 reaches an over-speed condition, the governor 22 is triggered initially to engage a switch, which in turn cuts power to the elevator drive and drops the machine brake to arrest movement of the drive sheave (not shown) and thereby arrest movement of elevator car 16. If, however, the elevator car 16 continues to experience an overspeed condition, the governor 22 may then act to trigger the safety brakes 24 to arrest movement of the elevator car 16 (i.e. an emergency stop). In addition to engaging a switch to drop the machine brake, the governor 22 also releases a clutching device that grips the governor rope 34. The governor rope 34 is connected to the safety brakes 24 through mechanical linkages 26, levers 28, and lift rods 30. As the elevator car 16 continues its descent, the governor rope 34, which is now prevented from moving by the actuated governor 22, pulls on the operating levers 28. The operating levers 28 actuate the safety brakes 24 by moving the linkages 26 connected to the lift rods 30, and the lift rods 30 cause the safety brakes 24 to engage the guide rails 20 to bring the elevator car 16 to a stop.

It will be appreciated that, whilst a roped elevator is described here, the examples of a safety brake actuator described here will work equally well with a ropeless elevator system e.g. hydraulic systems, systems with linear motors, and other ropeless elevator designs.

Whilst mechanical speed governor systems are still in use in many elevator systems, others (e.g. ropeless elevator systems without mechanical speed governor systems) are now implementing electronically actuated systems to trigger the emergency safety brakes 24, e.g. using an electronic or electrical actuation signal. Some of these electronically actuated systems use friction between a magnet and the guide rail 20 to mechanically actuate a linkage to engage the safety brakes 24. Other electronically actuated safety brake actuators do not utilize friction against the guide rail 20 to actuate the safety brakes 24, but may use an electromagnet, a spring, a weight, or other components to actuate a linkage to engage the safety brakes 24.

Figure 2:
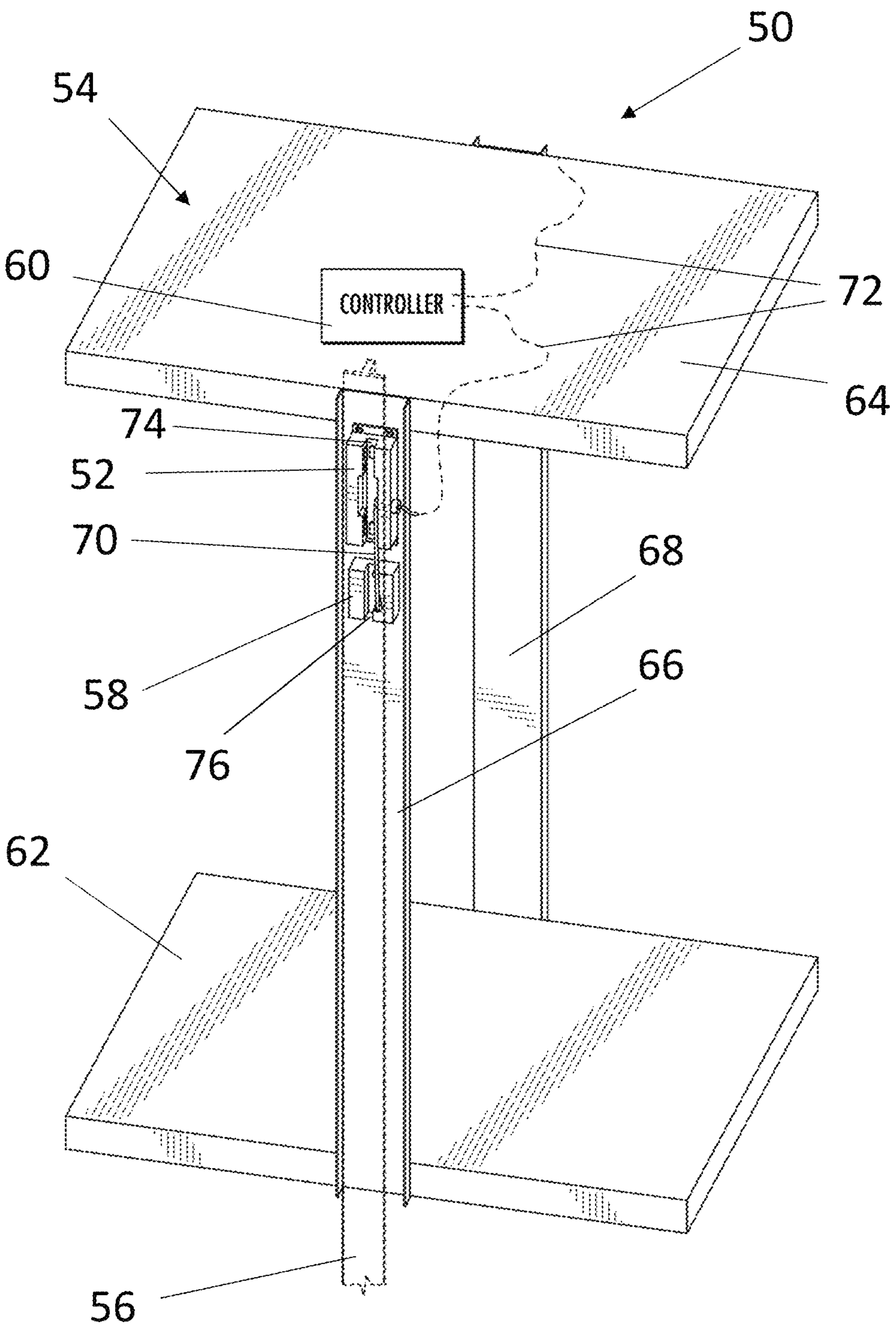
FIG. 2 shows an example of an elevator system employing an electronically actuated safety brake actuator.

FIG. 2 shows an example of an elevator system 50 employing an electronically actuated safety brake actuator 52. The elevator system 50 comprises the safety brake actuator 52, an elevator car 54, two guide rails 56, a safety brake 58, and a controller 60. For clarity, one of the guide rails 56 is shown in dotted outline and the other guide rail is omitted from FIG. 2.

The elevator car 54 comprises a platform 62, a ceiling 64, a first structural member 66 and a second structural member 68. The elevator car 54 also comprises panels and other components forming walls of the elevator car 54, but those panels and other components are omitted from FIG. 2 for clarity.

The safety brake actuator 52 and the safety brake 58 are mounted on the first structural member 66. The safety brake actuator 52 is mechanically connected to the safety brake 58 via a linkage 70. A second safety brake actuator and a second safety brake are provided on the second structural member, but these are omitted for clarity. In this example, the controller 60 is mounted in the ceiling 64 and is in communication with safety brake actuator 52 via connections 72.

In other examples, a controller may be provided in a different position, e.g. mounted elsewhere in the elevator car 54 or provided as part of the safety brake actuator 52.

In this example, the safety brake actuator 52 has a slot 74 which accommodates the guide rail 56. However, this is not essential. For example, the safety brake actuator 52 may be shaped without slot and may be mounted adjacent to the guide rail 56. In this example, the safety brake 58 also has a slot 76 which accommodates the guide rail 56. In use, the elevator car 54 moves up and down the guide rails 56. In the event that the safety brake 58 needs to be engaged (e.g. in an elevator car overspeed situation), the controller 60 sends a signal to the safety brake actuator 52 to engage the safety brake 58. In response to the signal, an actuation mechanism in the safety brake actuator 52 exerts a pulling force on the linkage 70. The pulling force is transmitted via the linkage 70 to the safety brake 58, pulling the safety brake 58 into frictional engagement with the guide rail 56, bringing the elevator car 54 to a stop.

Figure 3A:
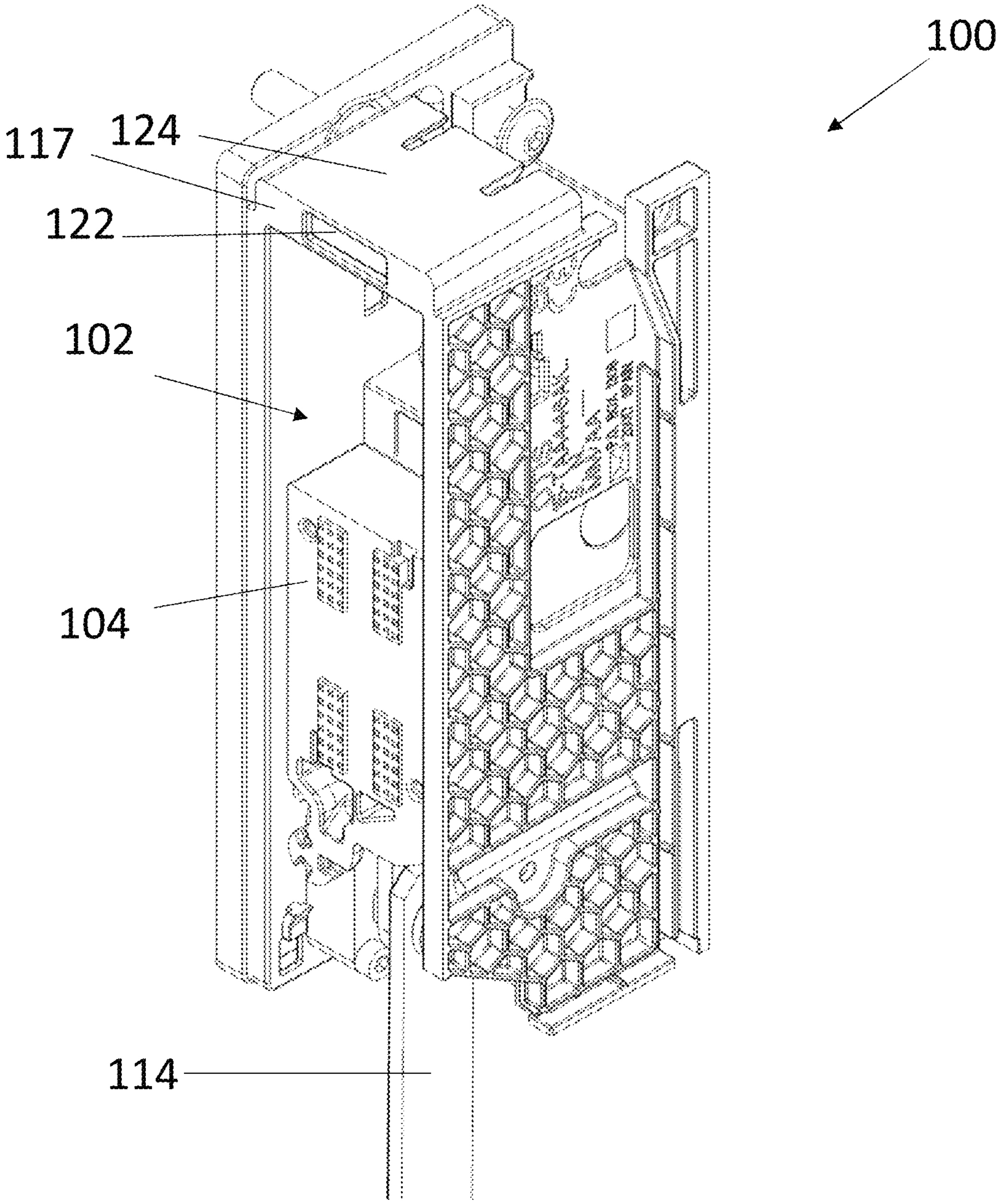
FIG. 3A shows a perspective view of a safety brake actuator according to a first example of the present disclosure.
Figure 3B:
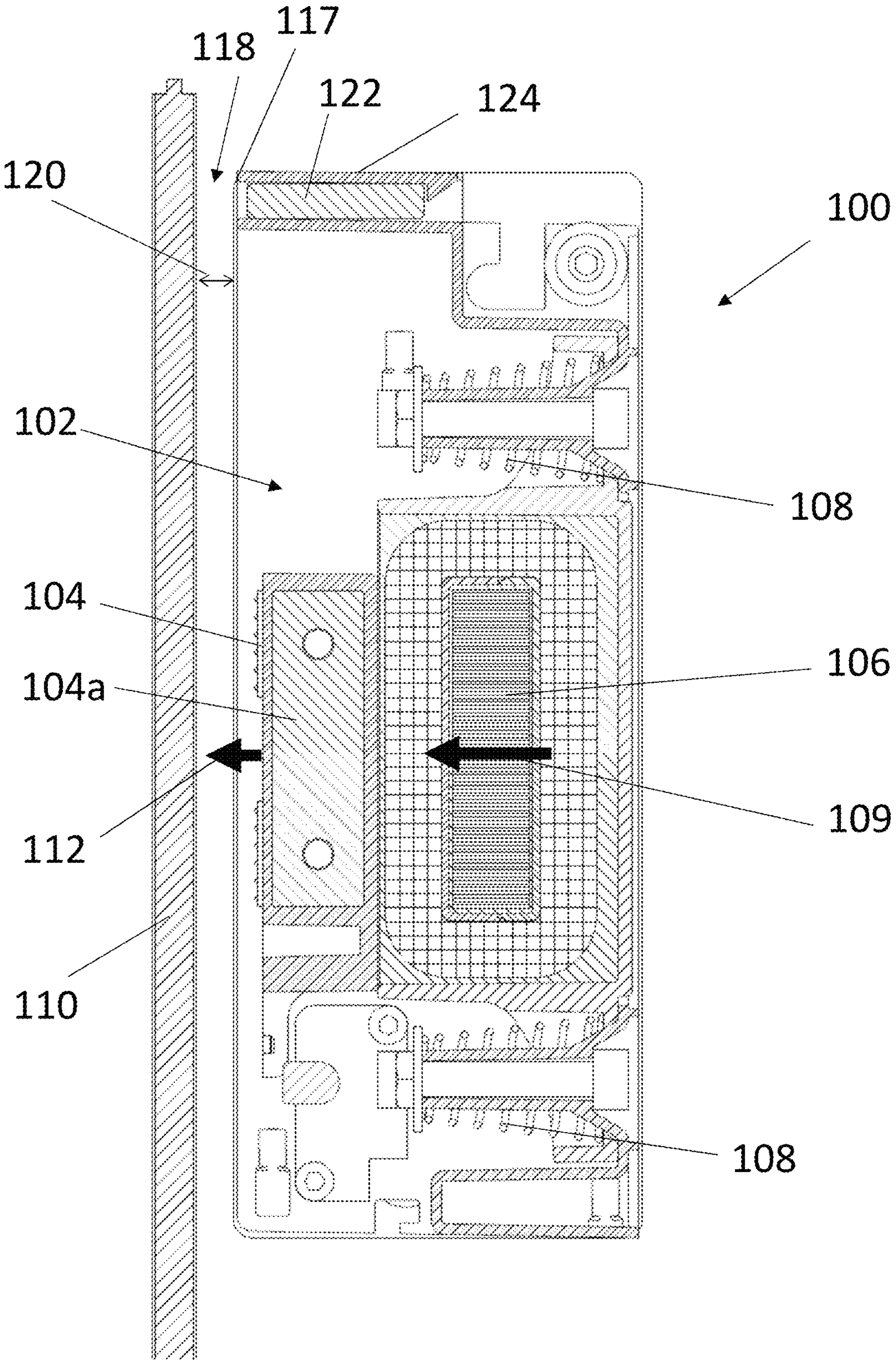
FIG. 3B shows a side cross-sectional view of the safety brake actuator of FIG. 3A.

FIGS. 3A and 3B show respectively a perspective view and a side cross-sectional view of a first example safety brake actuator 100 for use in an elevator system in accordance with the present disclosure. For example, the safety brake actuator 100 may be used in the elevator system 50 of FIG. 2.

The safety brake actuator 100 is arranged to engage a safety brake (not shown in FIGS. 3A and 3B) in an elevator system in response to an actuation signal. The safety brake actuator 100 has an actuation mechanism 102 which comprises a brake pad 104, and electromagnet 106 and two biasing springs 108.

When the safety brake actuator 100 is mounted on an elevator car in use, the brake pad 104 faces a guide rail 110 (see FIG. 3B). The brake pad 104 comprises a permanent magnet 104*a*. The permanent magnet 104*a* is attracted to the electromagnet 106 and thereby retains the brake pad 104 in contact with the electromagnet 106 (as shown in FIG. 3B) during normal operation of the elevator system (i.e. when the safety brake is not engaged).

The electromagnet 106 is moveable in the direction shown by the arrow 109, i.e. towards the guide rail 110, but is retained away from the guide rail 110 by the biasing springs 108 which exert a biasing force on the electromagnet 106 against the direction of the arrow 109. Thus during normal operation of the elevator, the electromagnet 106 and the brake pad 104 (which is held in contact with the electromagnet 106 by the permanent magnet 104*a*) are both held away from the guide rail 110 by the biasing springs 108.

In the event that the safety brake needs to be engaged, a current is applied to the electromagnet 106 which creates a repulsive magnetic force repelling the permanent magnet 104*a* in the brake pad 104, propelling the brake pad 104 across the clearance gap 118 to the guide rail 110. The guide rail 110 is made from a magnetic material, so the permanent magnet 104*a* in the brake pad 104 is attracted to the guide rail 110 and holds the brake pad 104 in contact with the guide rail 110. The relative movement of the elevator car with respect to the guide rail 110 causes the brake pad 104 to be dragged along the guide rail 110. This exerts an upward frictional force on the brake pad 104, causing the brake pad 104 to move upwards relative to the elevator car. The brake pad 104 is connected to a linkage 114, which is attached to the safety brake. When the brake pad 104 moves upwards, it exerts a pulling force on the linkage 114. The pulling force is transmitted by the linkage 114 to the safety brake, pulling the safety brake into frictional engagement with the guide rail 110.

To reset the safety brake actuator 100, a reverse current is applied to the electromagnet 106, so that it is attracted to the permanent magnet 104*a* in the brake pad 104. This attraction causes the electromagnet 106 to move in the direction of the arrow 109 towards the permanent magnet 104*a* against the biasing force of the biasing springs 108. When the electromagnet 106 contacts the brake pad 104, the magnetic attraction between the electromagnet 106 and the permanent magnet 104*a* holds the electromagnet 106 and the brake pad 104 in contact. The biasing force of the biasing springs 108 is sufficient to overcome the attraction between the permanent magnet 104*a* and the guide rail 110 and detaches the permanent magnet 104*a* from the guide rail 110. The electromagnet 106 and the brake pad 104 then both move back to the position shown in FIG. 3B under the biasing force of the biasing springs 108.

The above-described actuation mechanism is only an example, and other actuation mechanisms may be used. For example, the brake pad may comprise a magnetic material but no permanent magnet, and the electromagnet may be used to retain the brake pad away from the guide rail against a biasing force provided by a biasing arrangement, e.g. springs. In such examples, the electromagnet may be continuously powered to retain the brake pad away from the guide rail until the safety brake needs to be actuated. To engage the safety brake, power to the electromagnet is discontinued (e.g. in response to an actuation signal or in the event of a power failure). When power to the electromagnet is discontinued, the brake pad is no longer held in contact with the electromagnet against the biasing force. The biasing arrangement pushes the brake pad into frictional engagement with the guide rail, resulting in an upwards force on the brake pad. This upwards force is transmitted to the linkage which pulls the safety brake into frictional engagement with the guide rail. In other possible arrangements, an electromagnet may be used to retain a moveable member against an upwards biasing force which, when released from the electromagnet, may pull a linkage upwards into an actuated state to engage the safety brake. These and other examples of actuation mechanisms may be used in this example and in other examples of safety brake actuators in accordance with the present disclosure.

As can be seen from FIGS. 3A and 3B, the safety brake actuator 100 comprises a proximal surface 117, i.e. a surface which is proximal to the guide rail 110 when the safety brake actuator 100 is mounted adjacent to the guide rail 110 in use. As can be seen from FIG. 3B, the proximal surface 117 is facing and spaced from the guide rail 110 to define a clearance gap 118 between the guide rail 110 and the proximal surface 117 of the safety brake actuator 100. The clearance gap 118 has a width shown by the arrow 120.

The clearance gap 118 allows for some lateral movement of the safety brake actuator 100 relative to the guide rail 110 as the elevator car moves up and down the guide rail 110 during operation of the elevator system. However, the clearance gap 118 is large enough to allow foreign objects such as small components and debris to fall into the clearance gap 118. The foreign objects may become lodged in the safety brake actuator 100, and in particular may become stuck to the electromagnet 106, to the permanent magnet 104*a* in the brake pad 104, or to any other permanent magnet or electromagnet that forms part of the safety brake actuator 100. This may prevent the actuation mechanism 102 working correctly. For example, if a magnetic piece of debris becomes stuck to the front face of the brake pad 104, it may reduce the frictional force between the guide rail 110 and the brake pad 104, which may then be insufficient to actuate the linkage 114 and pull the safety brake into engagement with the guide rail 110.

The safety brake actuator 100 comprises a permanent magnet 122 mounted in a top portion of a housing 124 of the safety brake actuator 100. The permanent magnet 122 is oriented to direct a magnetic field into the clearance gap 118. When magnetic foreign objects fall into the clearance gap 118, they are attracted by the permanent magnet 122 and become stuck to the permanent magnet 122 instead of falling down the clearance gap 118 where they may become lodged in or stuck to part of the actuation mechanism 102. The foreign objects may be subsequently removed from the permanent magnet 122, e.g. during routine maintenance of the elevator system.

Figure 4A:
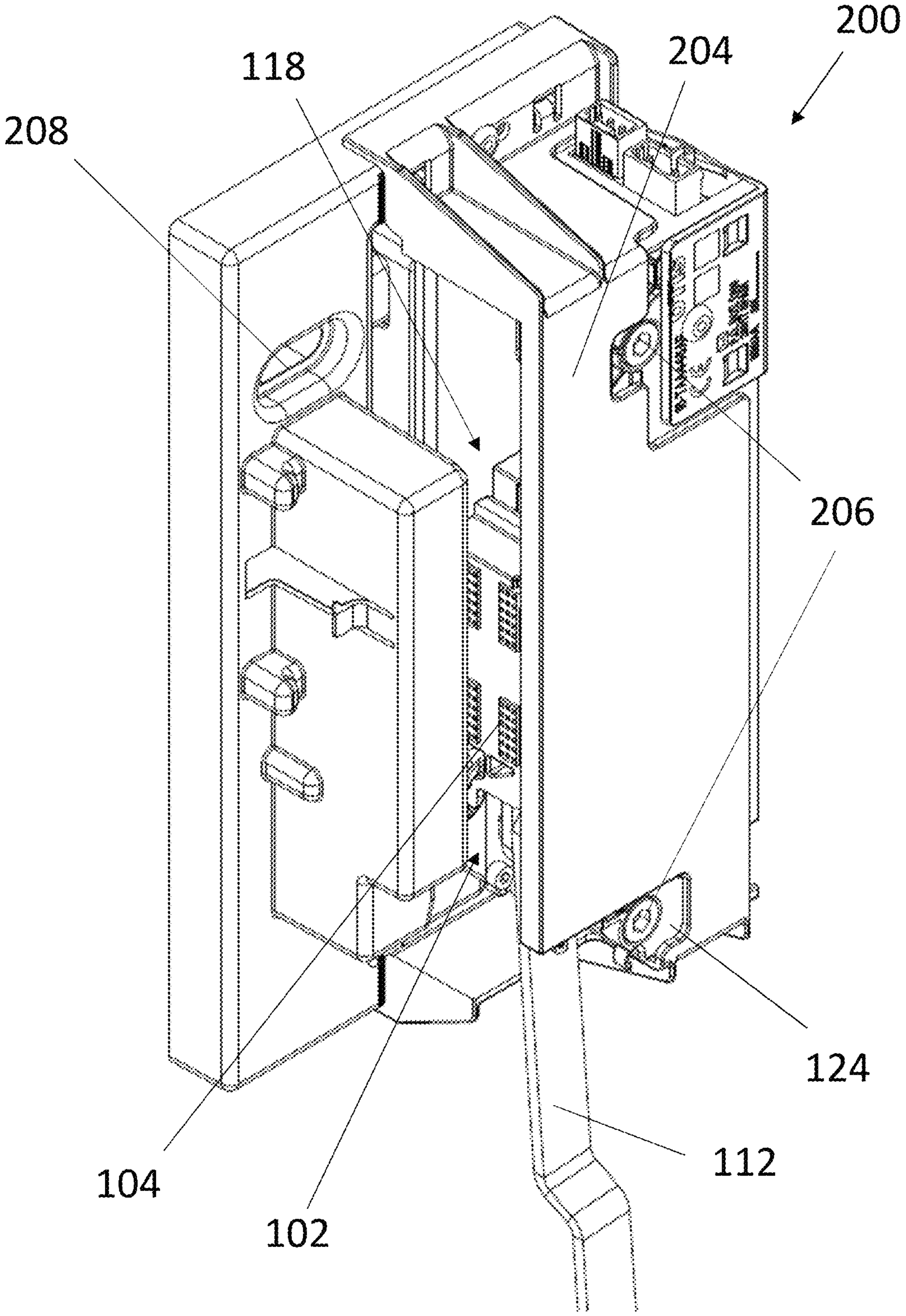
FIG. 4A shows a perspective view of a safety brake actuator according to a second example, wherein the safety brake actuator comprises a moveable cover.
Figure 4B:
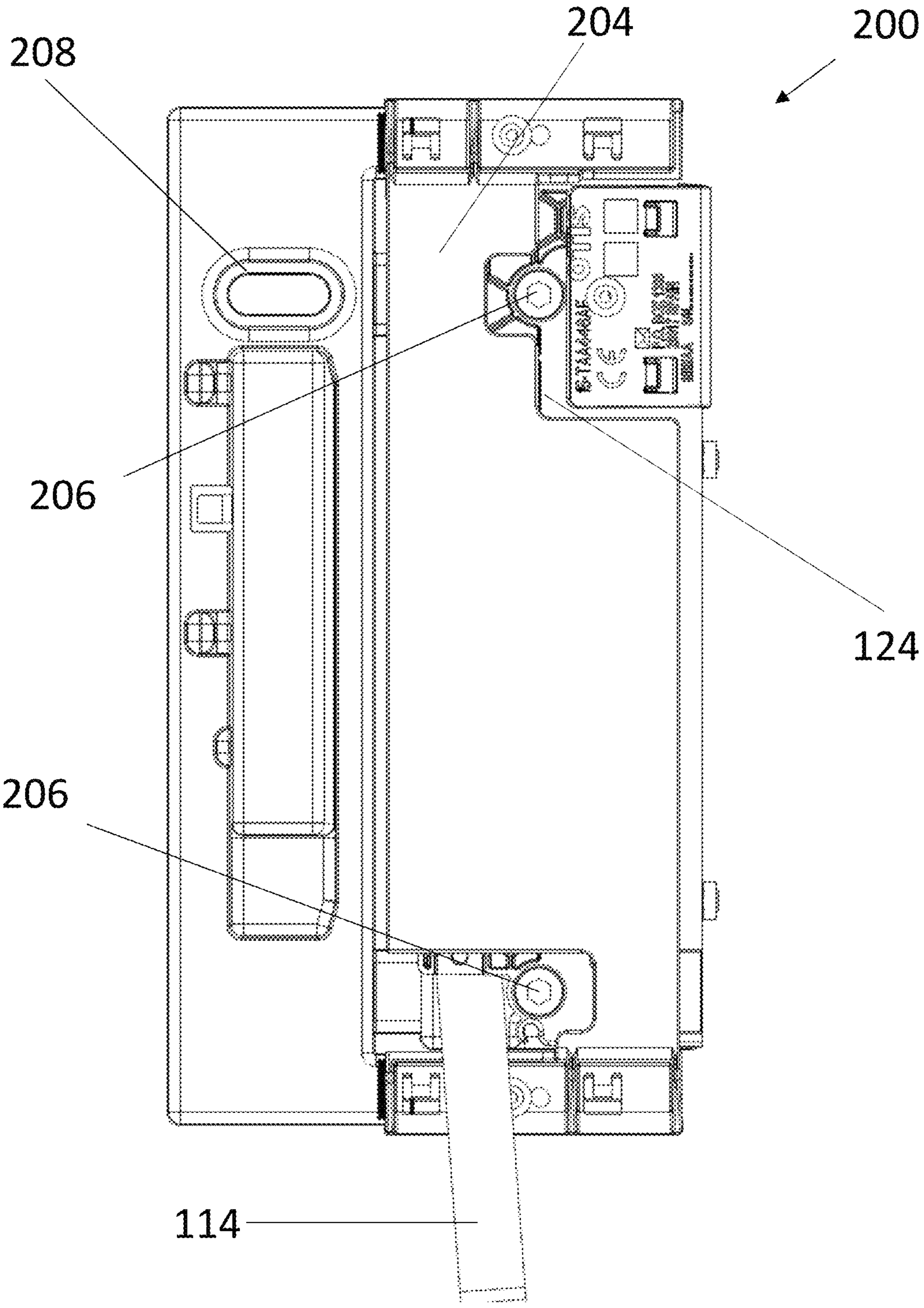
FIG. 4B shows a front view of the safety brake actuator of FIG. 4A.
Figure 4C:
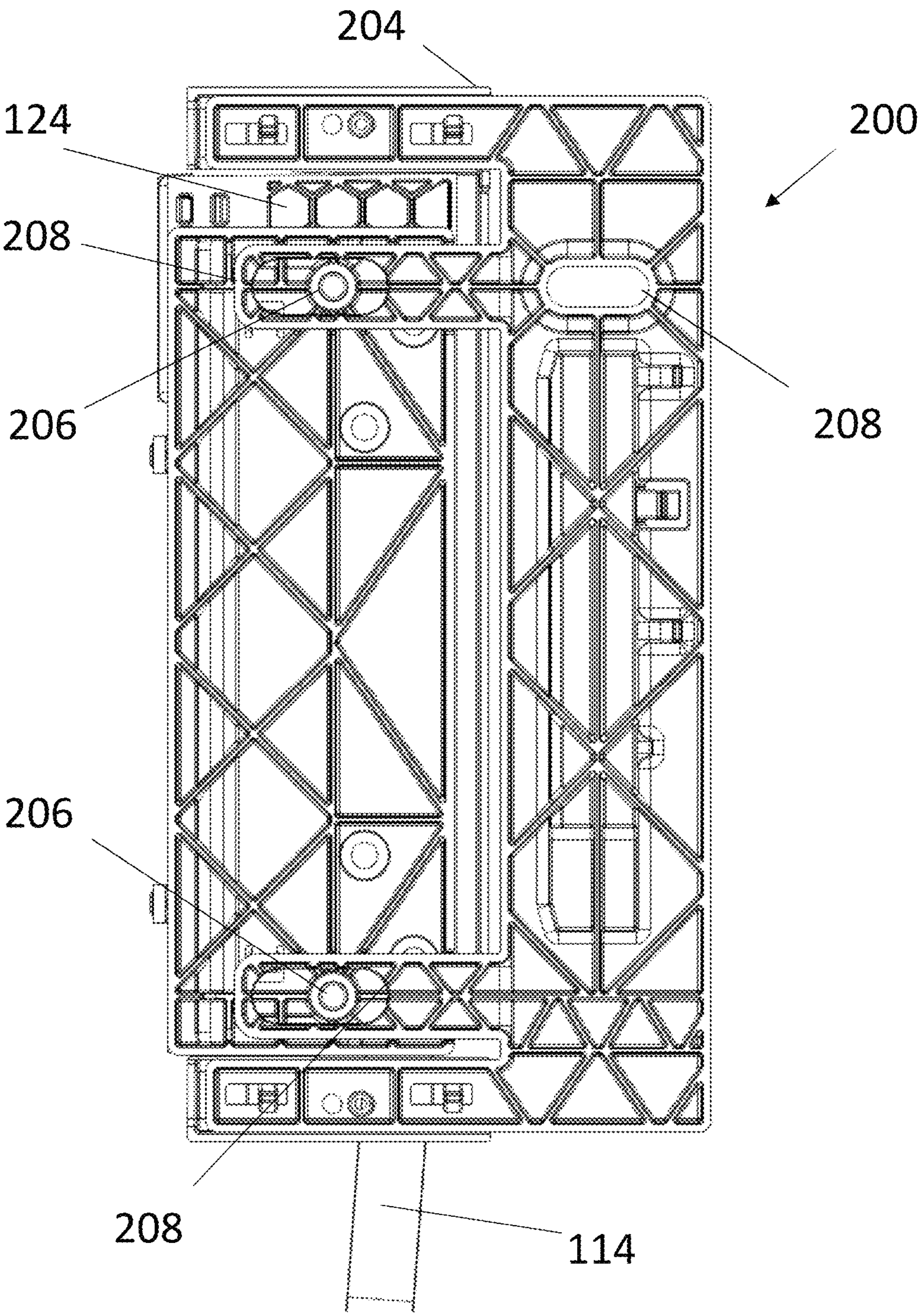
FIG. 4C shows a rear view of the safety brake actuator of FIG. 4A.
Figure 4D:
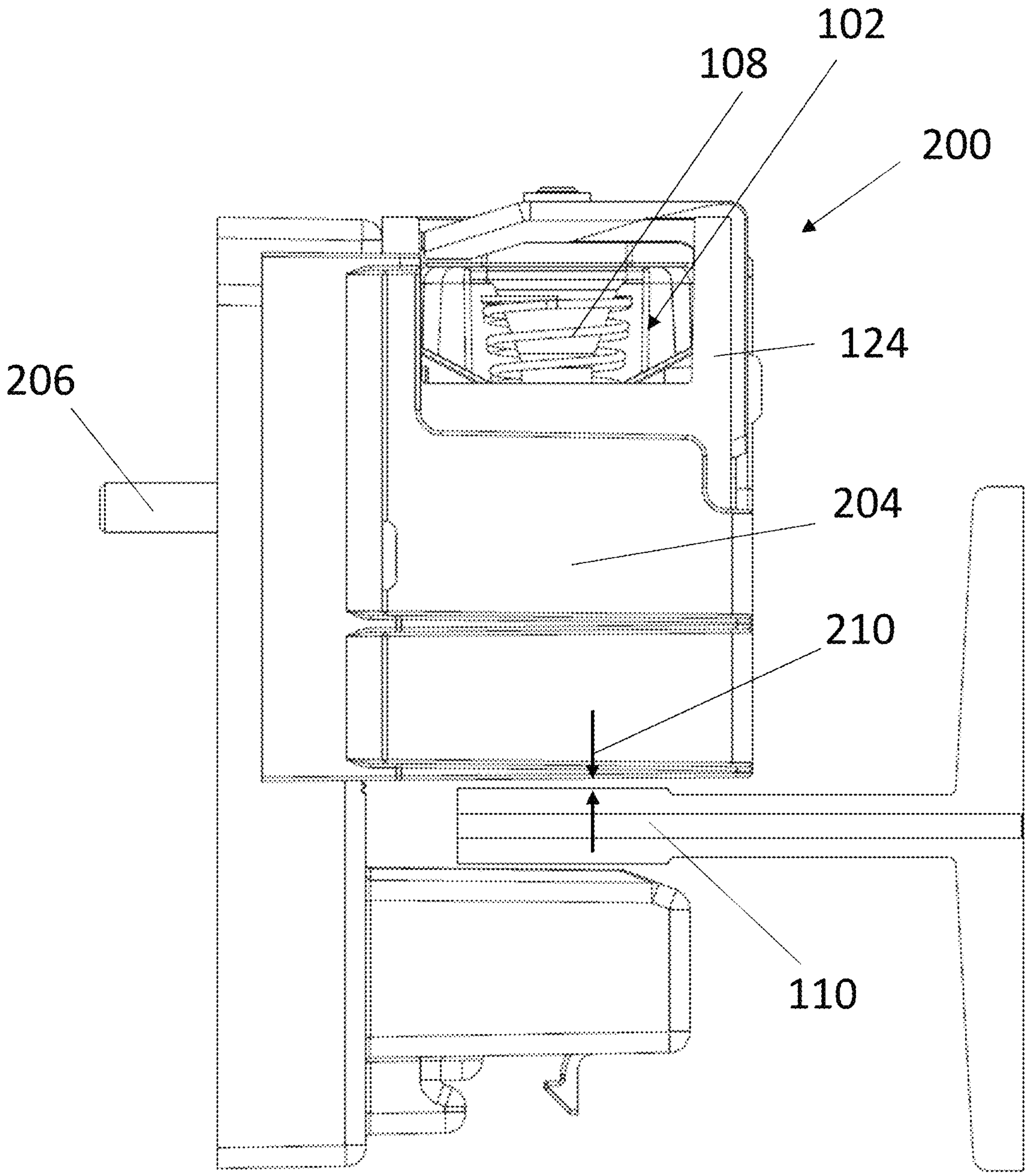
FIG. 4D shows a top view of the safety brake actuator of FIG. 4A.
Figure 4E:
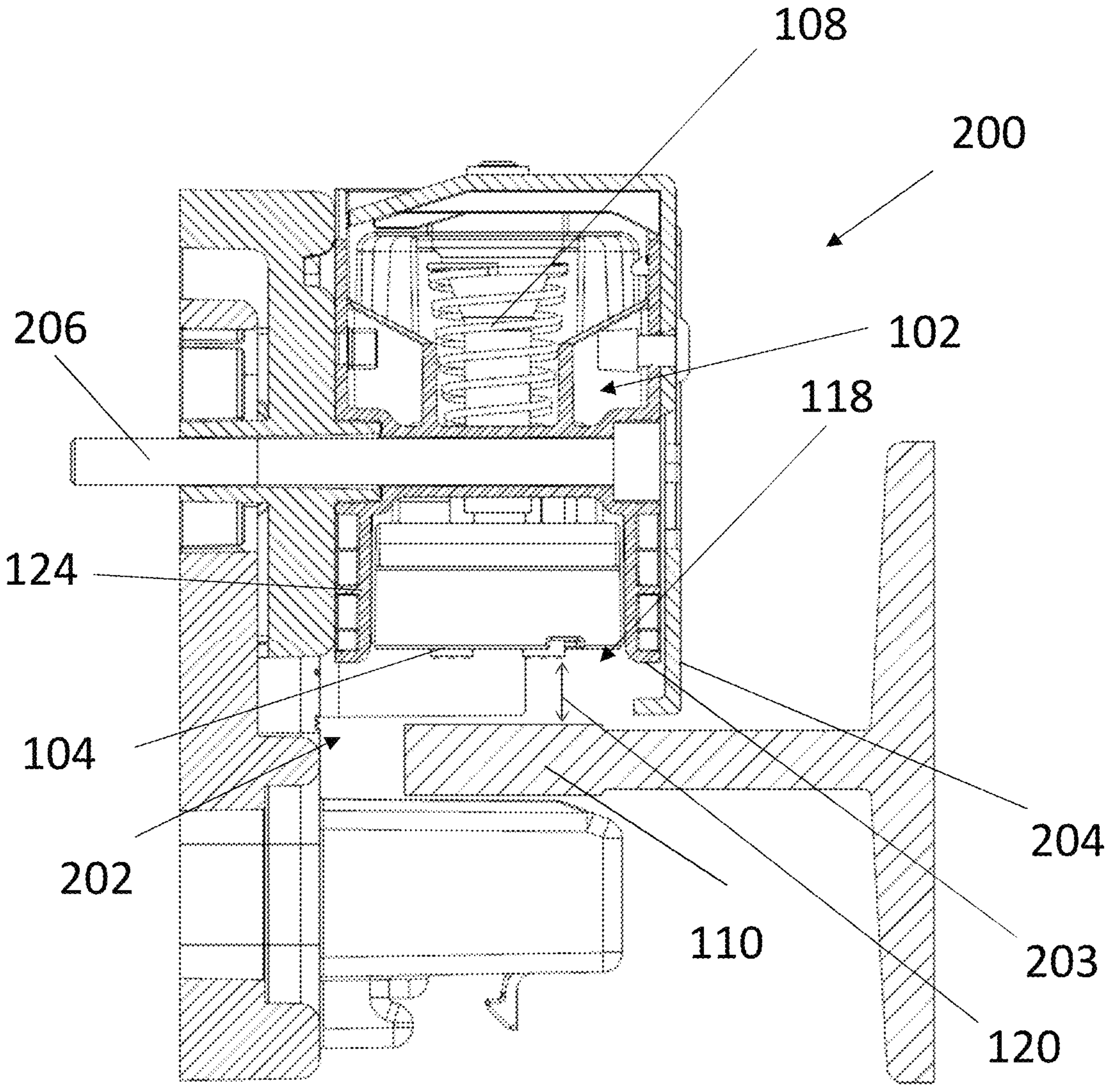
FIG. 4E shows a top cross-sectional view of the safety brake actuator of FIG. 4A.

FIGS. 4A to 4E show a second example of a safety brake actuator 200 for use in an elevator system in accordance with the present disclosure. For example, the safety brake actuator 200 may be used in the elevator system 50 of FIG. 2. FIG. 4A shows a perspective view of the safety brake actuator 200 of the second example. FIGS. 4B and 4C show front and rear views respectively. FIG. 4D shows a top view and FIG. 4E shows a cross-sectional view from the same viewpoint as FIG. 4D.

The safety brake actuator 200 comprises an actuation mechanism 102 as described above with reference to FIGS. 3A and 3B (and the same reference numerals are used to label corresponding parts), but any other suitable actuation mechanism may be used, including the alternatives and variations described above.

The safety brake actuator 200 also comprises a slot 202 for accommodating a guide rail 110. As shown in FIG. 4E, the slot 202 comprises a proximal surface 203 of the safety brake actuator 200, which faces and is spaced from the guide rail 110 in use, such that the position of the guide rail 110 in the slot 202 defines a clearance gap 118 between the guide rail 110 and the proximal surface 203 of the safety brake actuator 200.

In this example, the safety brake actuator 200 is provided with a cover 204. The cover 204 substantially encloses the safety brake actuator 200, except on the side that faces the guide rail 110 (not shown in FIGS. 4A to 4C).

The safety brake actuator 200 is configured to be mounted on an elevator car (not shown in FIGS. 4A to 4E) by mounting screws 206 (of which two are shown in FIGS. 4A to 4C and one in FIGS. 4D to 4E). The cover 204 is mounted over the safety brake actuator 200, but the cover 204 is not fixedly attached to the safety brake actuator 200. Instead, the cover 204 is mounted via oval slots 208 provided in the cover 204. When the cover 204 and safety brake actuator 200 are mounted together on the elevator car, the mounting screws 206 are positioned in the slots 208 so that the cover 204 is supported on the mounting screws 206. The mounting screws 206 and the slots 208 are free to move relative to each other, i.e. so that the mounting screws 206 can slide within the slots 208. The cover 204 is thereby able to move laterally relative to the safety brake actuator 200.

As can be seen in FIG. 4E, the clearance gap 118 has a relatively large width, as shown by the arrow 120. However, with the cover 204 in place, the clearance gap has a reduced width, as shown by the arrows 210 in FIG. 4D.

FIGS. 5A to 5D show a series of cross-sections of the safety brake actuator 200 of FIGS. 4A to 4E, illustrating how the moveable mounting of the cover 204 on the mounting screws 206 accommodates lateral movement of the safety brake actuator 200 relative to the guide rail 110. For additional clarity, FIGS. 6A to 6D show a series of corresponding simplified schematics of the cross-sections in FIGS. 5A to 5D, with the same reference numerals used to label corresponding parts.

Figure 5A:
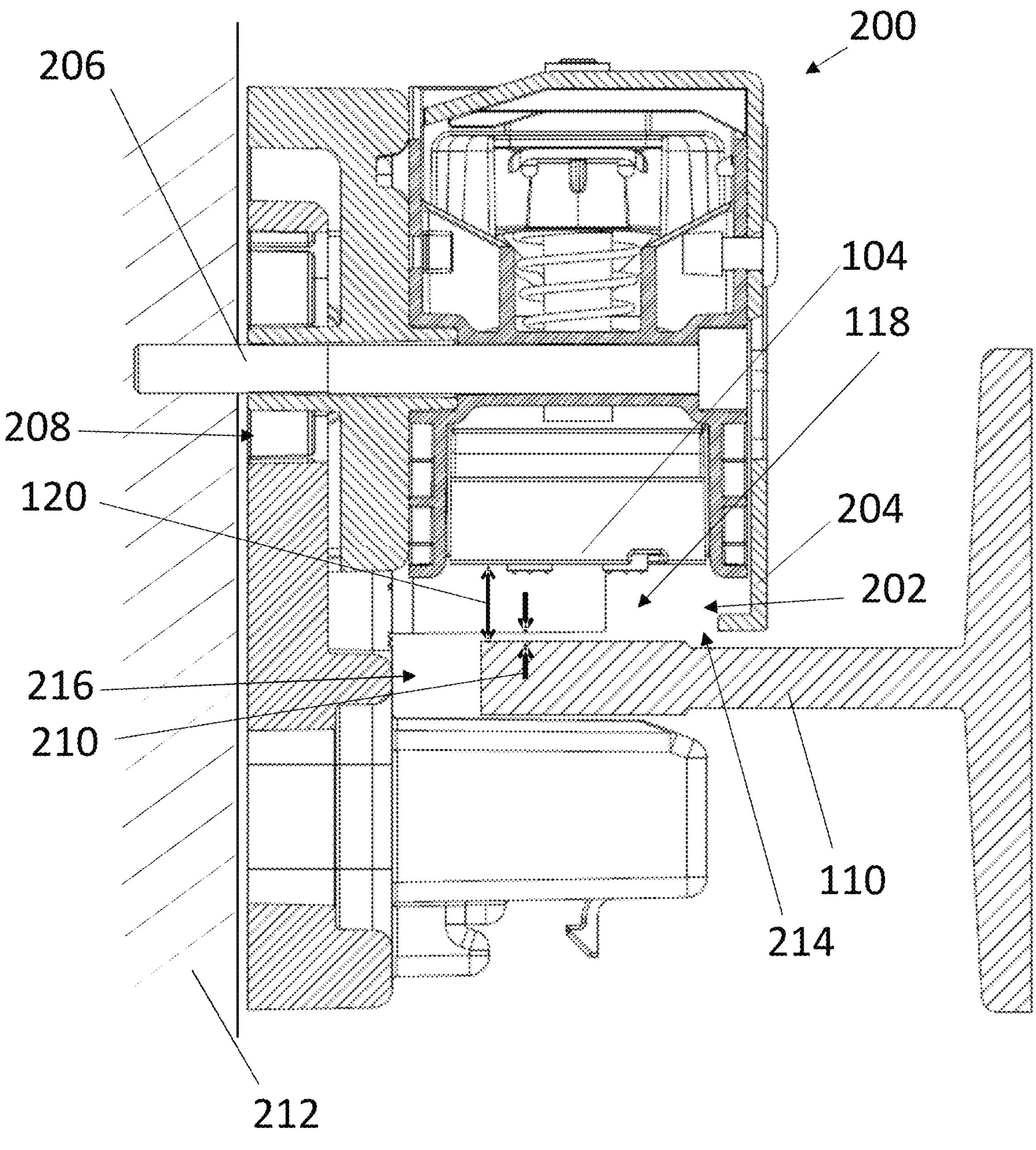
FIGS. 5A to 5D show a series of top cross-sectional views of the safety brake actuator of FIG. 4A, showing movement of the moveable cover.
Figure 5B:
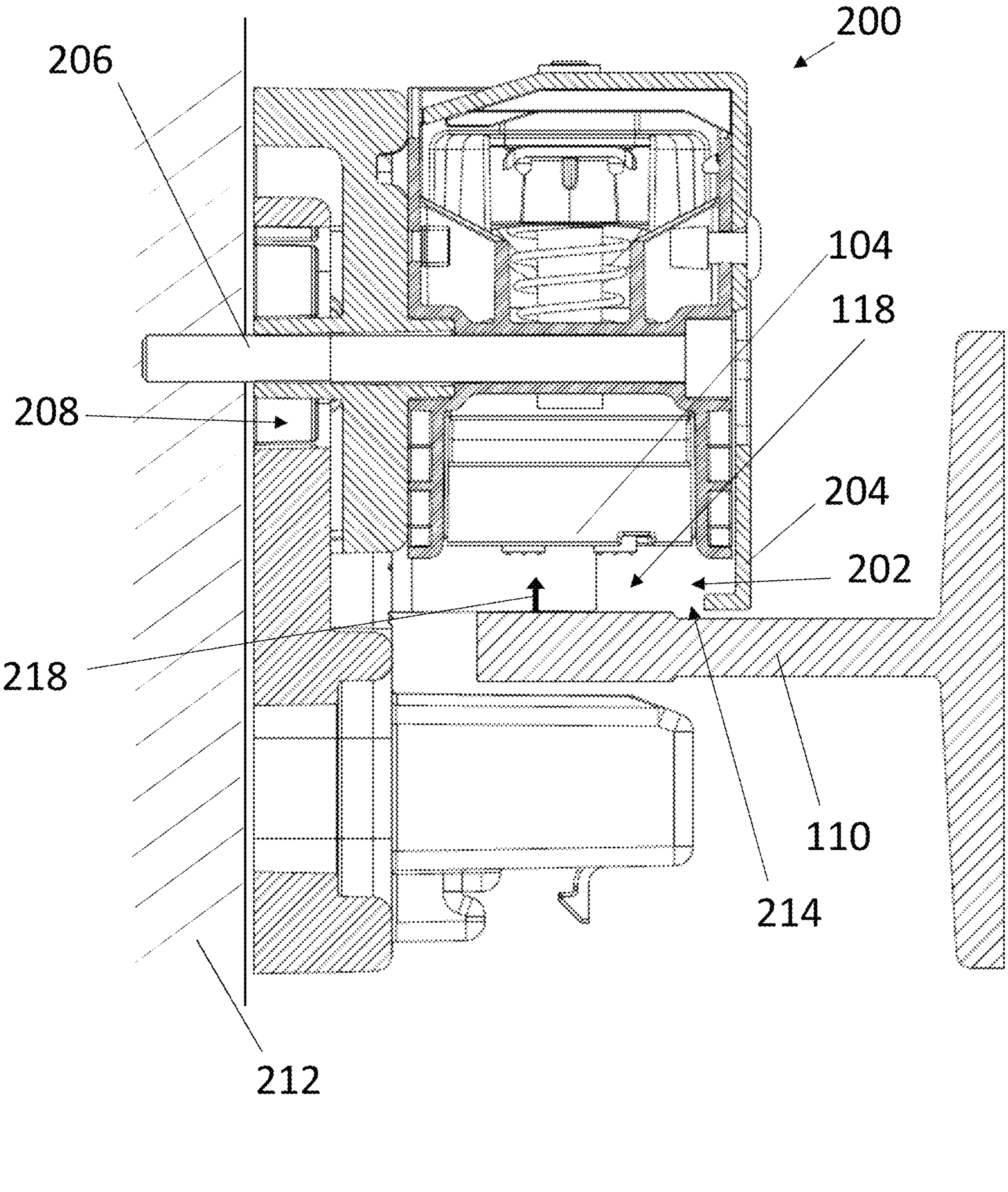

FIG. 5A shows the safety brake actuator 200 mounted on an elevator car 212 by the mounting screws 206 (of which one mounting screw is visible in FIGS. 5A to 5D). A corresponding simplified schematic of the view in FIG. 5A is shown in FIG. 6A. The cover 204 is mounted over the safety brake actuator 200 via the oval slots 208 (of which one slot is visible) around the mounting screws 206. The cover 204 has a hole 214 to allow the brake pad 104 of the safety brake actuator 200 to be brought into engagement with the guide rail 110.

As mentioned above, the safety brake actuator 200 has a slot 202 for accommodating the guide rail 110, as well as accommodating lateral movement of the safety brake actuator 200 relative to the guide rail. The position of the guide rail 110 in the safety brake actuator's slot 202 defines a clearance gap 118, with a width shown by the arrow 120.

The cover 204 extends into the clearance gap 118 and has a narrow slot 216 for accommodating the guide rail 110. The position of the guide rail 110 in the cover's slot 216 defines a reduced width (shown by arrows 210) of the clearance gap.

Figure 6A:
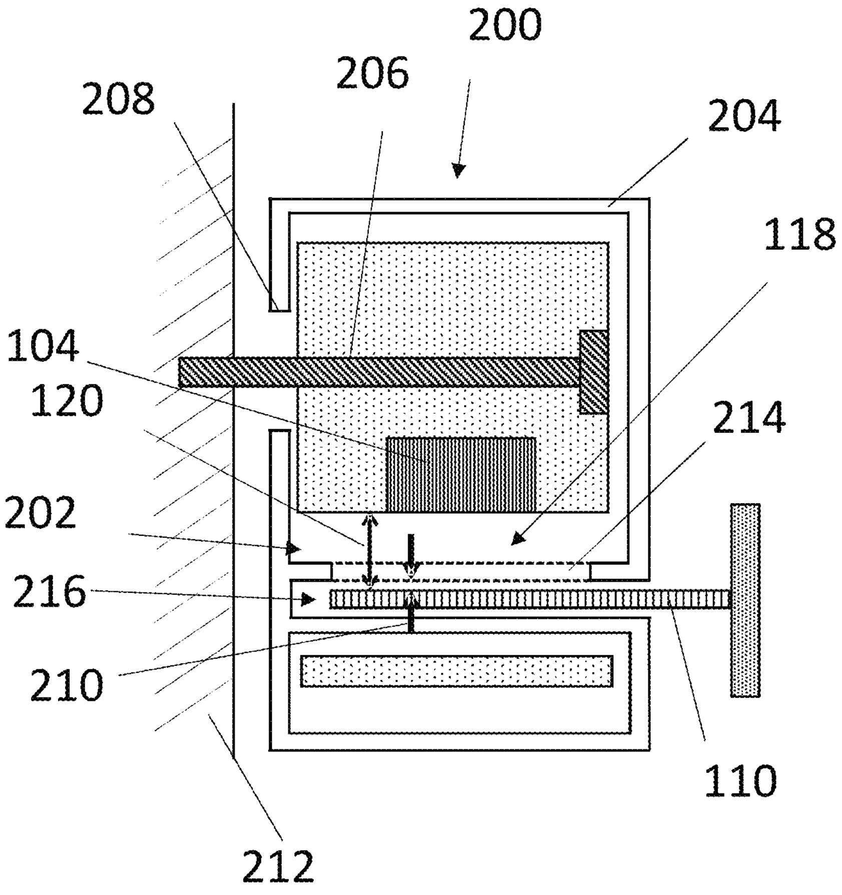
FIGS. 6A to 6D show a series of corresponding simplified schematics of the cross-sections in FIGS. 5A to 5D.
Figure 6B:
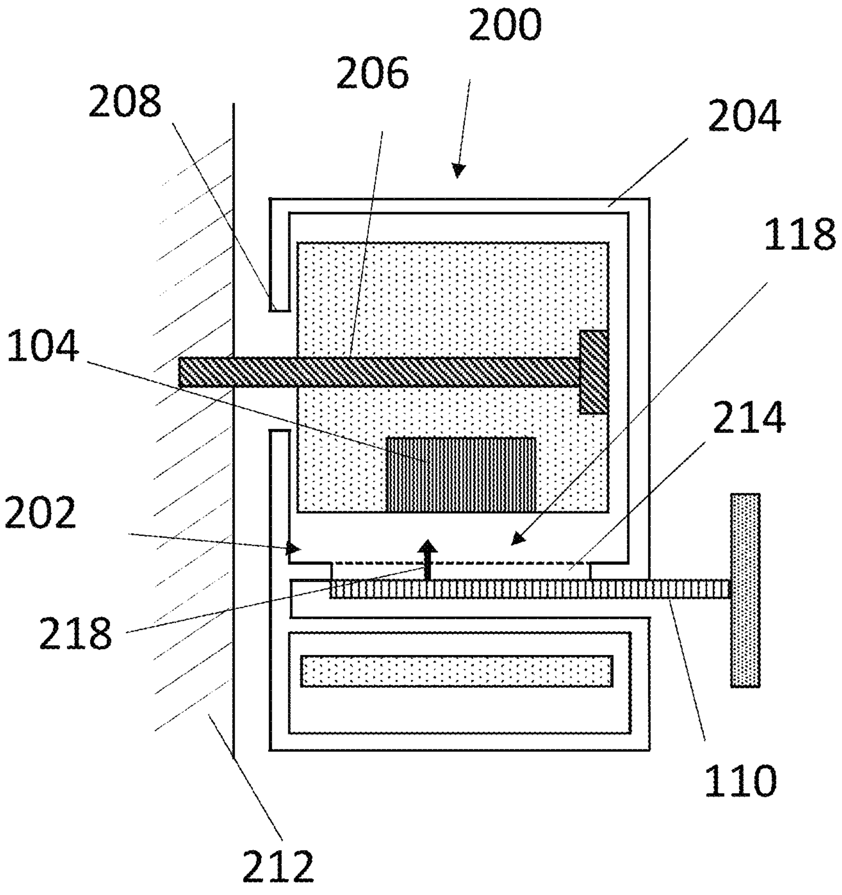

During operation of the elevator, the safety brake actuator 200 may undergo lateral movement over a distance greater than the reduced width of the clearance gap 118. When this happens, the guide rail 110 abuts the cover 204, as shown in FIG. 5B, exerting a force on the cover 204 in the direction of the arrow 218. A corresponding simplified schematic of the view in FIG. 5B is shown in FIG. 6B.

Figure 5C:
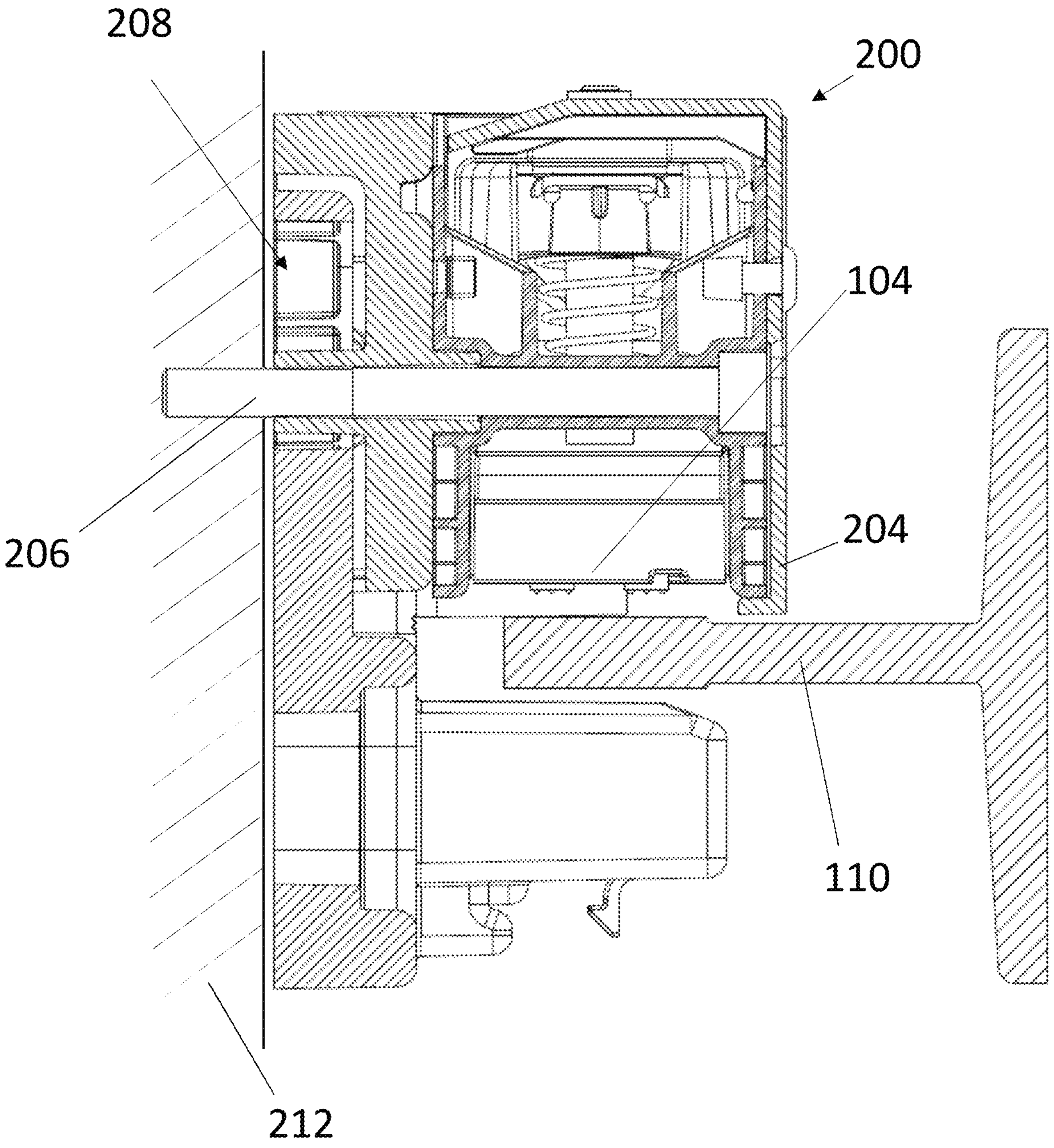
Figure 6C:
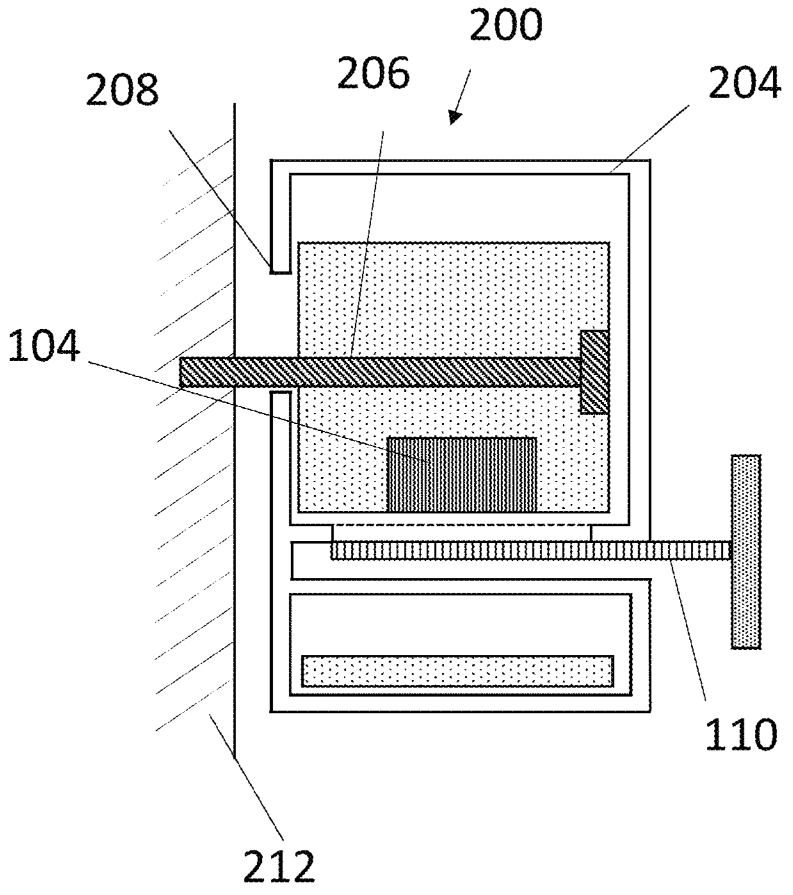

As the cover 204 is moveable relative to the safety brake actuator 200, the cover 204 moves in the direction of the force shown by the arrow 218 to a position as shown in FIG. 5C. It can be seen in FIG. 5C that this movement of the cover 204 maintains a reduced width of the clearance gap, which is zero in the position shown in FIG. 5C. A corresponding simplified schematic of the view in FIG. 5C is shown in FIG. 6C.

Figure 5D:
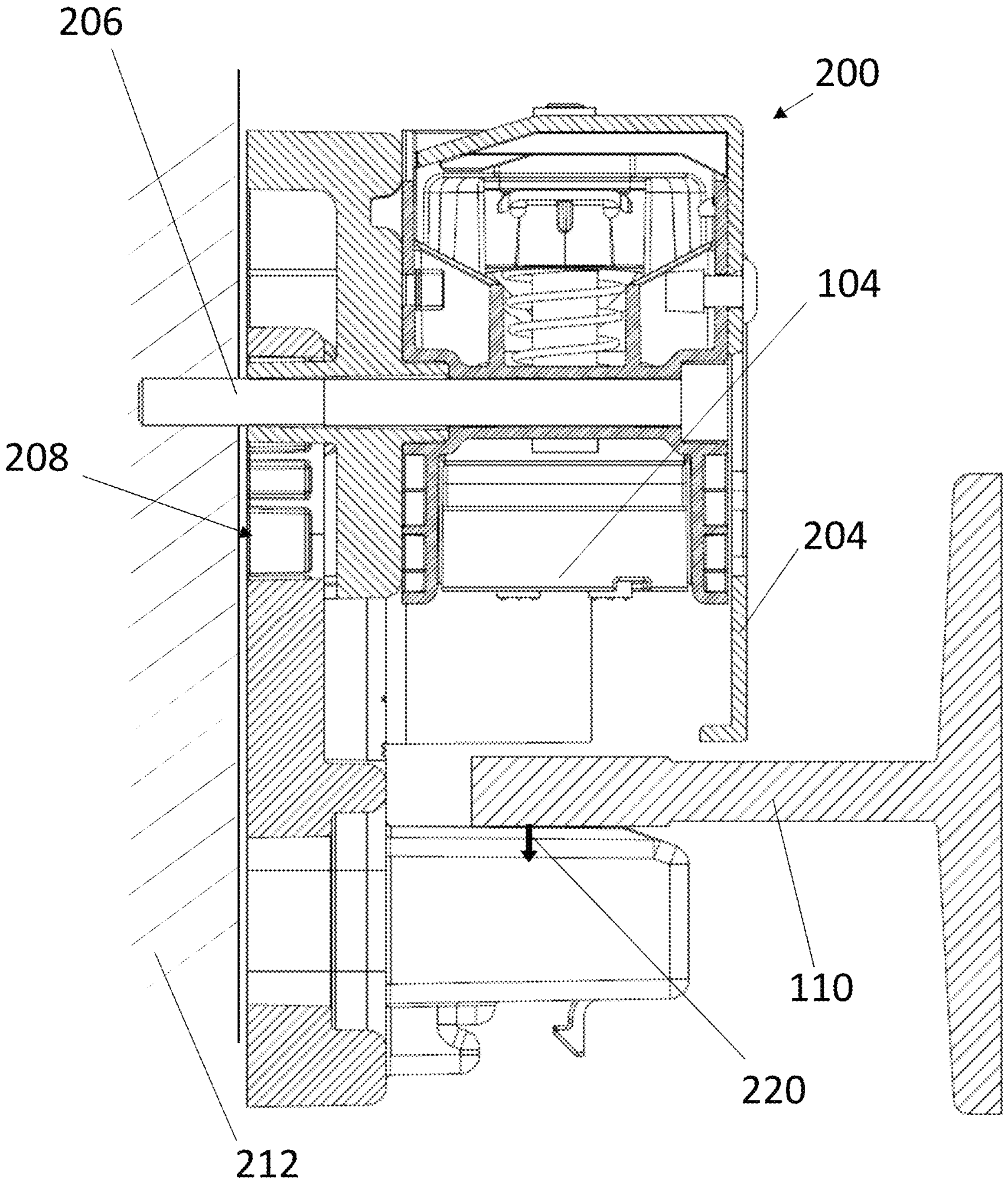
Figure 6D:
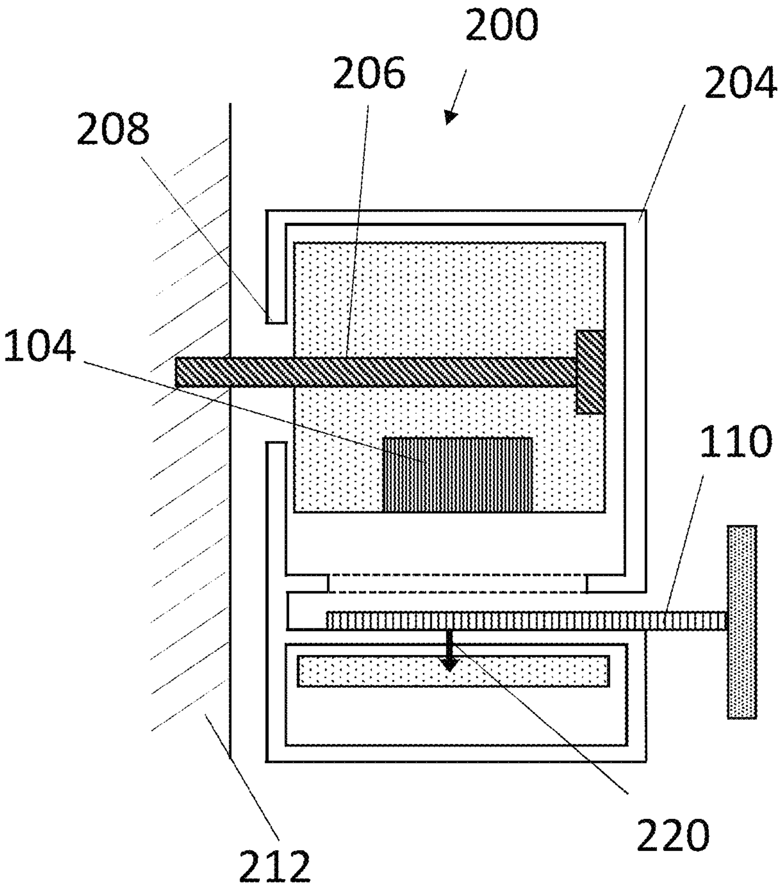

If the safety brake actuator 200 subsequently moves in the opposite direction, a similar process occurs in which the guide rail 110 abuts the cover 204 on the other side of the cover's slot 216, causing the cover 204 to move in the other direction, as shown by the arrow 220 in FIG. 5D. As can be seen in FIG. 5D, the cover 204 still provides a reduced width of the clearance gap 118 in this position. A corresponding simplified schematic of the view in FIG. 5D is shown in FIG. 6D.

Figure 7A:
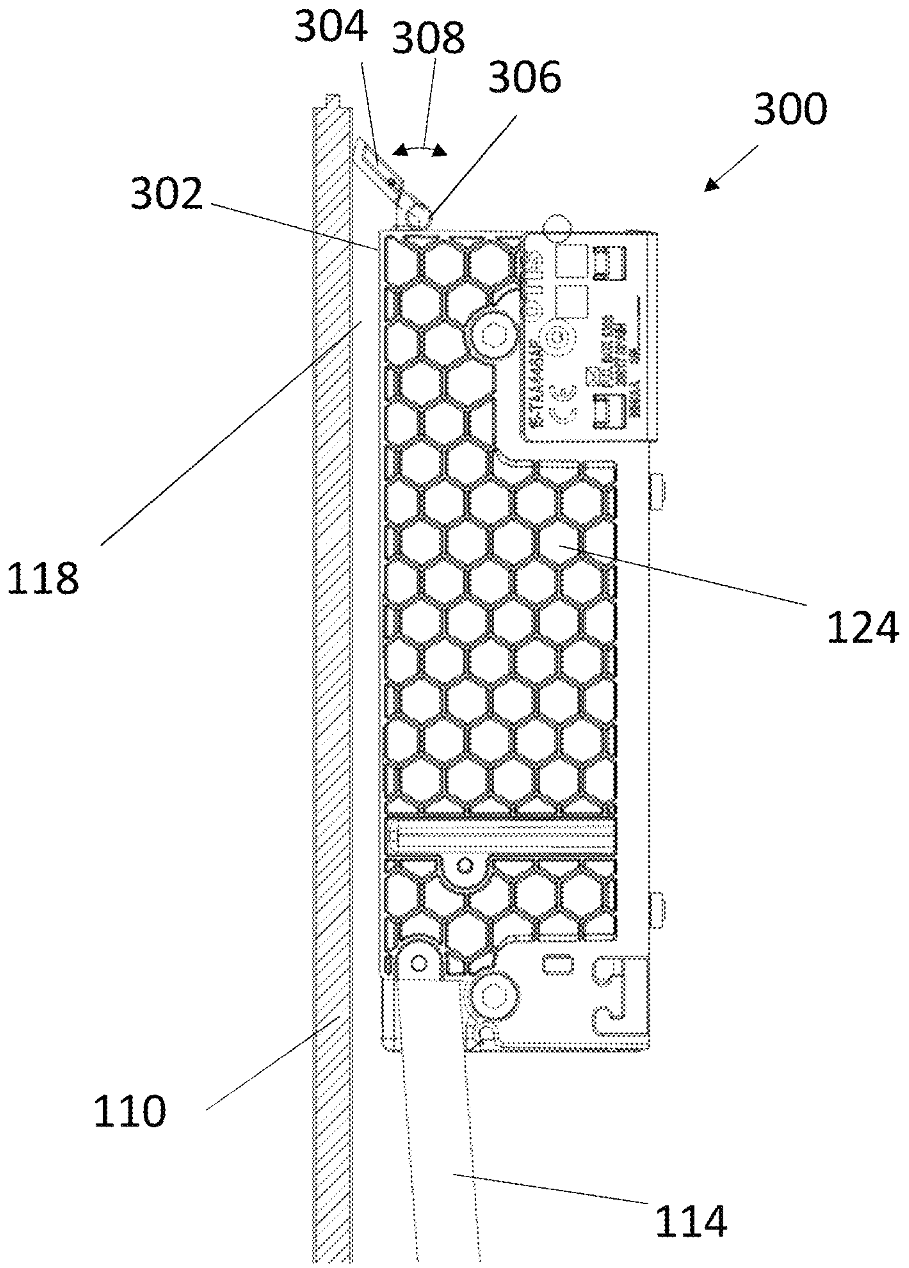
FIG. 7A shows a side view of a safety brake actuator according to a third example, wherein the safety brake actuator comprises a resiliently biased barrier.
Figure 7B:
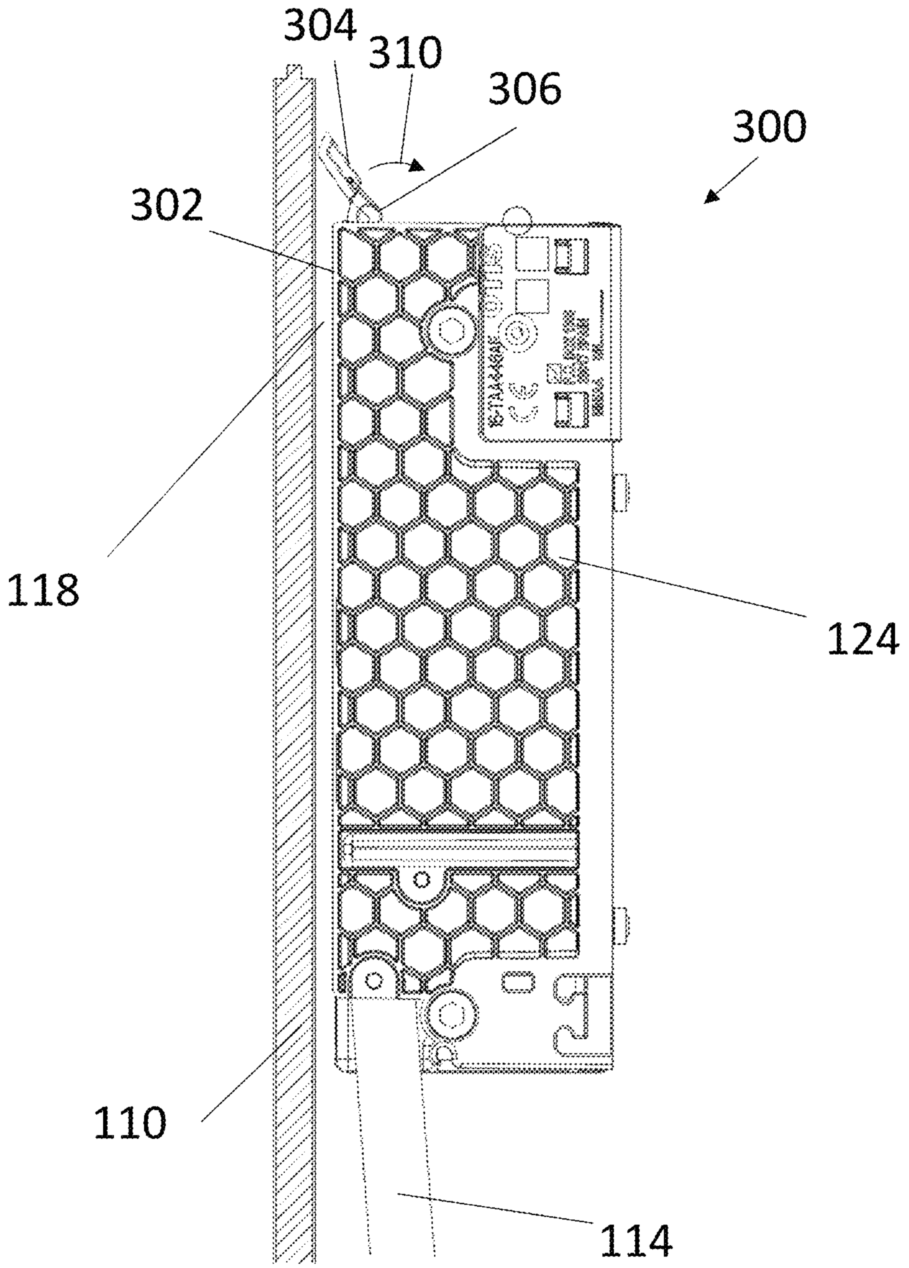
FIG. 7B shows a side view of the safety brake actuator of FIG. 7A, showing movement of the safety brake actuator relative to a guide rail in a first direction.
Figure 7C:
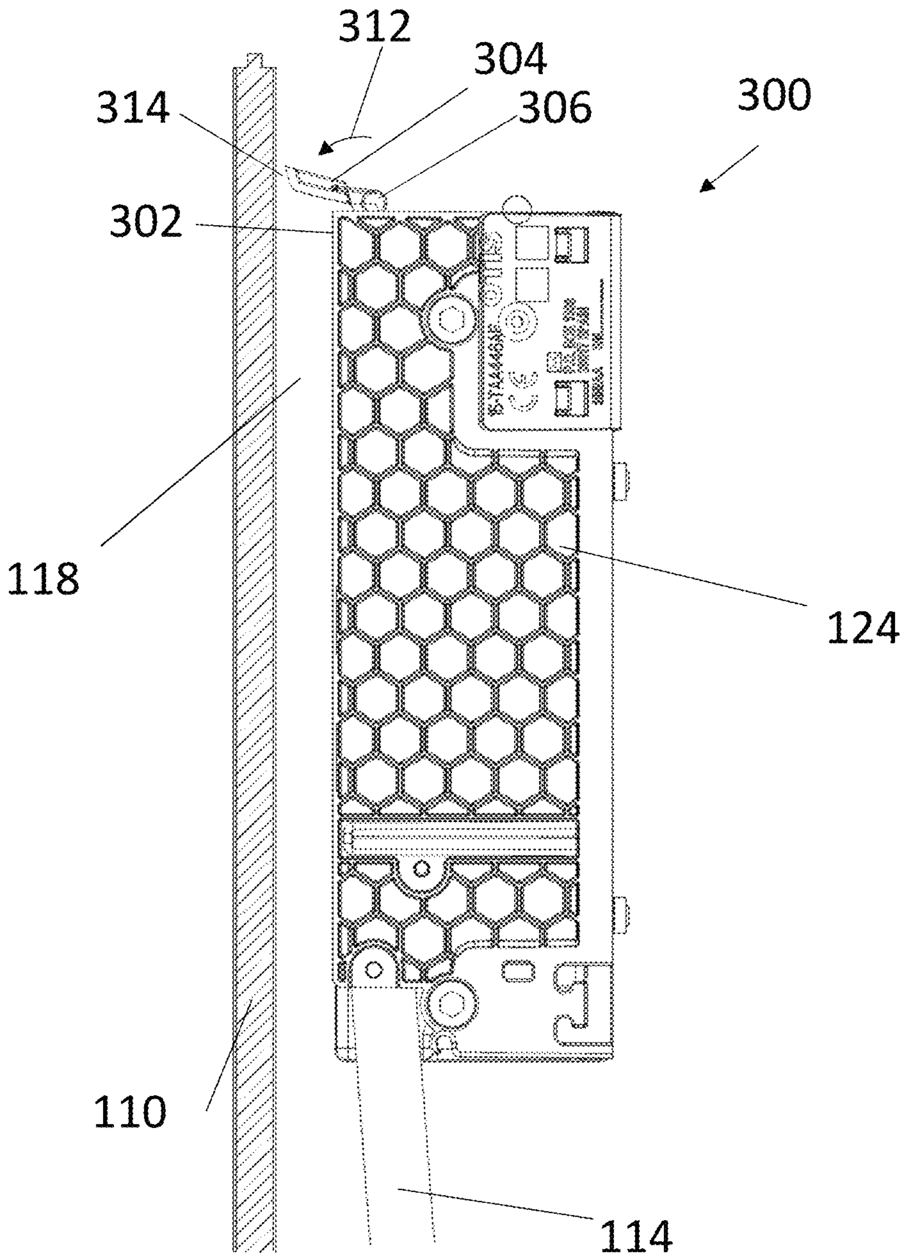
FIG. 7C shows a side view of the safety brake actuator of FIG. 7A, showing movement of the safety brake actuator relative to the guide rail in a second direction.

FIGS. 7A to 7C show a third example of a safety brake actuator 300 for use in an elevator system in accordance with the present disclosure. For example, the safety brake actuator 300 may be used in the elevator system 50 of FIG. 2.

The safety brake actuator 300 comprises an actuation mechanism as described above with reference to FIGS. 3A and 3B, although any other suitable actuation mechanism may be used, including the alternatives and variations described above.

The safety brake actuator 300 is mounted to an elevator car (not shown), adjacent to a guide rail 110. The safety brake actuator 300 comprises a proximal surface 302 and is mounted to the elevator car with the proximal surface 302 facing and spaced from the guide rail 110 to define a clearance gap 118.

The safety brake actuator 300 comprises a housing 124, on which is mounted a barrier 304. The barrier 304 is mounted via a spring 306 which forms a hinge. Although a spring is used in this example, any other suitable resilient hinge could be used. The barrier 304 can move in an angular direction around the spring 306 (as shown by the arrow 308) and is biased by the spring 306 in a direction towards the guide rail 110. In the position shown in FIG. 7A, the spring 306 is touching the guide rail 110 so that the barrier 304 completely covers the clearance gap 118 (i.e. reducing the width of the clearance gap to zero), preventing foreign objects entering the clearance gap 118.

As the elevator car moves, the safety brake actuator 300 moves relative to the guide rail 110. FIG. 7B shows the safety brake actuator 300 when it has moved to the left (as viewed in FIG. 7A) relative to the guide rail 110. In this case, the clearance gap 118 becomes smaller, and the guide rail 110 pushes against the barrier 304. The barrier 304 moves clockwise (as shown by the arrow 310) against the biasing force provided by the spring 306 to accommodate this relative movement. The barrier 304 remains in contact with the guide rail 110, completely covering the clearance gap 118 and maintaining a reduced width of zero for the clearance gap 118.

FIG. 7C shows the safety brake actuator 300 when it has moved to the right (as viewed in FIG. 7A) relative to the guide rail 110. In this case, the clearance gap 118 becomes larger, and the guide rail 110 moves away from the barrier 304. The biasing force provided by the spring 306 moves the barrier 304 anti-clockwise as shown by the arrow 312. In the example shown, the barrier 304 reaches the maximum extent of its movement in the anti-clockwise direction and there is a small gap 314 between the barrier 304 and the guide rail 110. The barrier 304 therefore partially covers the clearance gap 118, maintaining a reduced but non-zero width for the clearance gap 118 and impeding entry of foreign objects into the clearance gap 118. In other examples, the barrier 304 may be configured (e.g. may have sufficient length) so that it always remains in contact with the guide rail 110 as the safety brake actuator 300 moves relative to the guide rail 110.

Figure 8:
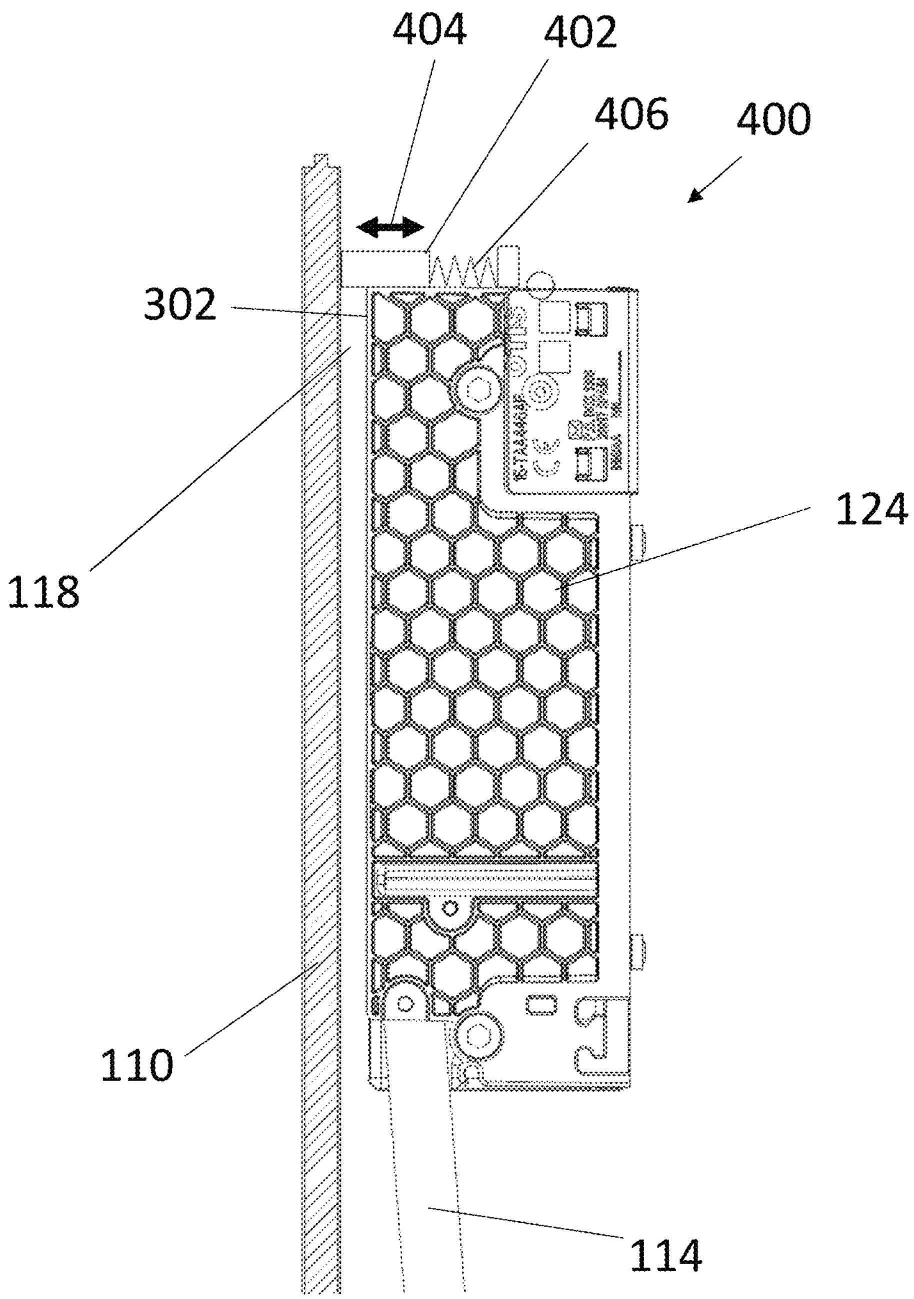
FIG. 8 shows a side view of a safety brake actuator which is a variation of the safety brake actuator of FIG. 7A.

FIG. 8 shows a safety brake actuator 400 which is a variation on the example of FIGS. 7A to 7C. The safety brake actuator 400 is the same as the safety brake actuator 300 of FIGS. 7A to 7C, except that it is provided with a barrier 402 that is slidably mounted on the housing 124. The barrier 402 can undergo translational movement towards and away from the guide rail 110, as shown by the arrow 404. A biasing arrangement, which in this example is a spring 406, provides a biasing force to bias the barrier 402 towards the guide rail 110. Other biasing arrangements could be used instead of the spring 406. In the position shown in FIG. 8, the barrier 402 is touching the guide rail 110. As the safety brake actuator 400 moves laterally with respect to the guide rail 110, the spring 406 pushes the barrier 402 against the guide rail 110 to keep it in contact with the guide rail 110, such that the barrier 402 completely covers the clearance gap 118, preventing foreign objects from entering the clearance gap 118.

It will be appreciated by those skilled in the art that the disclosure has been illustrated by describing one or more specific aspects thereof, but is not limited to these aspects; many variations and modifications are possible, within the scope of the accompanying claims.

What is claimed is:

1. An elevator system (50) comprising a guide rail (56; 110), an elevator car (54), a safety brake actuator (100; 200; 300; 400) and a safety brake (58), wherein the safety brake actuator (100; 200; 300; 400) and the safety brake (58) are mounted to the elevator car (54) to move along the guide rail (56; 110) with the elevator car (54) in use;

wherein the safety brake actuator (100; 200; 300; 400) comprises:

an actuation mechanism (102) configured in use to actuate the engagement of the safety brake (58) against the guide rail (56; 110), wherein the actuation mechanism 102 includes a brake pad (104) having a permanent magnet (104*a*), an electromagnet (106) and at least one biasing spring (108), the electromagnet (106) configured to generate a repulsive magnetic force repelling the permanent magnet (104*a*) and propelling the brake pad (104) towards the guide rail (56; 110);

a proximal surface (117; 203; 302), wherein the safety brake actuator (100; 200; 300; 400) is mounted adjacent to the guide rail (56; 110) with the proximal surface (117; 203; 302) facing the guide rail (56; 110) and spaced from the guide rail (56; 110) to define a clearance gap (118) between the guide rail (56; 110) and the proximal surface (117; 203; 302) of the safety brake actuator (100; 200; 300; 400); and an object-diverting arrangement (122; 204; 304; 402) positioned relative to the clearance gap (118) to prevent or impede the entry of foreign objects into the clearance gap (118);

a linkage (114) connecting the brake pad (104) to the safety brake (58).

2. The elevator system (50) of claim 1, wherein the object-diverting arrangement (122; 204; 304; 402) is configured to capture or deflect foreign objects.

3. The elevator system (50) of claim 1, wherein the object-diverting arrangement comprises a magnet (122).

4. The elevator system (50) of claim 3, wherein the magnet (122) comprises a permanent magnet.

5. The elevator system (50) of claim 3, wherein the magnet (122) is disposed on the safety brake actuator (100) such that in use the magnet (122) is adjacent an uppermost entry point of the clearance gap (118).

6. The elevator system (50) of claim 3, wherein the magnet (122) is disposed on the safety brake actuator (100) such that in use the magnet (122) is higher than any permanent magnet(s) (104*a*) and electromagnet(s) (106) that form part of the actuation mechanism (102).

7. The elevator system (50) of claim 3, wherein the magnet (122) is mounted on an exterior of the safety brake actuator (100) or is mounted on or in a housing (124) provided on the safety brake actuator (100).

8. The elevator system (50) of claim 1, wherein the object-diverting arrangement comprises a structural barrier (204; 304; 402) extending partially or completely across the clearance gap (118).

9. The elevator system (50) of claim 8, wherein the structural barrier (204; 304; 402) extends across at least 50% of the clearance gap (118), e.g. at least 75% of the clearance gap (118), at least 90% of the clearance gap (118), e.g. 100% of the clearance gap (118).

10. The elevator system (50) of claim 8, wherein the structural barrier (204; 304; 402) is configured or mounted so that a physical position of the structural barrier (204; 304; 402) automatically adapts to variations in a size of the clearance gap (118) in response to any lateral movements of the safety brake actuator (200; 300; 400) relative to the guide rail (56; 110) during operation of the elevator system (50).

11. The elevator system (50) of claim 8, wherein the structural barrier comprises a cover (204) moveably mounted with respect to the safety brake actuator (200).

12. The elevator system (50) of claim 11, wherein the cover (204) comprises a slot (202) for accommodating the guide rail (56; 110).

13. The elevator system (50) of claim 8, wherein the structural barrier comprises a resiliently biased barrier (304; 402).

14. The elevator system (50) of claim 13, wherein the resiliently biased barrier (304; 402) protrudes a distance into the clearance gap (118), and wherein the resiliently biased barrier (304; 402) is biased towards a maximum protrusion distance.

15. A safety brake actuator (100; 200; 300; 400) for use in an elevator system (50) comprising a guide rail (56; 110), an elevator car (54), and a safety brake (58), wherein the safety brake (58) is mounted to the elevator car (54) and the safety brake actuator (100; 200; 300; 400) is configured to be mounted to the elevator car (54) to move along the guide rail (56; 110) with the elevator car (54) in use;

wherein the safety brake actuator (100; 200; 300; 400) comprises:

an actuation mechanism (102) configured in use to actuate the engagement of the safety brake (58) against the guide rail (56; 110), wherein the actuation mechanism 102 includes a brake pad (104) having a permanent magnet (104*a*), an electromagnet (106) and at least one biasing spring (108), the electromagnet (106) configured to generate a repulsive magnetic force repelling the permanent magnet (104*a*) and propelling the brake pad (104) towards the guide rail (56; 110);

a proximal surface (117; 203; 302) which, when the safety brake actuator (100; 200; 300; 400) is mounted adjacent to the guide rail (56; 110) with the proximal surface (117; 203; 302) facing the guide rail (56; 110) and spaced from the guide rail (56; 110) in use, defines a clearance gap (118) between the guide rail (56; 110) and the proximal surface (117; 203; 302) of the safety brake actuator (100; 200; 300; 400); and an object-diverting arrangement (122; 204; 304; 402) positioned relative to the clearance gap (118) to prevent or impede the entry of foreign objects into the clearance gap (118);

a linkage (114) connecting the brake pad (104) to the safety brake (58).

* * * * *